(12) United States Patent
Derouineau et al.

(10) Patent No.: US 11,859,150 B2
(45) Date of Patent: *Jan. 2, 2024

(54) THERMOASSOCIATIVE AND EXCHANGEABLE COPOLYMERS, COMPOSITION COMPRISING SAME

(71) Applicants: TOTAL MARKETING SERVICES, Puteaux (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR)

(72) Inventors: Thibault Derouineau, Coudrecieux (FR); Fanny Briand, Lyons (FR); Gregory Descroix, Brindas (FR); Renaud Nicolay, Verrieres le Buisson (FR)

(73) Assignees: TOTAL MARKETING SERVICES, Puteaux (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR)

(*) Notice: Subject to any disclaimer, the term of this patent is extended or adjusted under 35 U.S.C. 154(b) by 232 days.

This patent is subject to a terminal disclaimer.

(21) Appl. No.: 16/463,532

(22) PCT Filed: Nov. 21, 2017

(86) PCT No.: PCT/FR2017/053188
§ 371 (c)(1),
(2) Date: May 23, 2019

(87) PCT Pub. No.: WO2018/096252
PCT Pub. Date: May 31, 2018

(65) Prior Publication Data
US 2019/0375930 A1    Dec. 12, 2019

(30) Foreign Application Priority Data

Nov. 23, 2016  (FR) .................................. 1661400

(51) Int. Cl.
*C10M 145/14*     (2006.01)
*C08F 212/08*     (2006.01)
(Continued)

(52) U.S. Cl.
CPC ......... *C10M 145/14* (2013.01); *C08F 212/08* (2013.01); *C08F 220/1812* (2020.02);
(Continued)

(58) Field of Classification Search
CPC .......... C08L 35/06; C08L 33/04; C08L 33/08; C08L 33/06; C08L 33/10; C08L 33/066;
(Continued)

(56) References Cited

U.S. PATENT DOCUMENTS 5,370,807 A * 12/1994 Gambini ............... C08F 230/06
                                                      508/198
10,508,250 B2 * 12/2019 Nicolay ............. C10M 169/044
(Continued)

FOREIGN PATENT DOCUMENTS

WO   WO-2015110642 A1 * 7/2015 ........ C10M 159/005
WO   WO-2016113229 A1 * 7/2016 ........ C10M 169/044

OTHER PUBLICATIONS

Feb. 5, 2018 Search Report issued in International Patent Application No. PCT/FR2017/053188.
(Continued)

*Primary Examiner* — Satya B Sastri
(74) *Attorney, Agent, or Firm* — Oliff PLC

(57) ABSTRACT

Compositions resulting from the mixing of at least one copolymer A1, resulting from the copolymerization of at least one monomer functionalized by diol functions with at (Continued)

least one styrenic monomer, and at least one compound A2 comprising at least two boronic ester functions. They have very varied rheological properties depending on the proportion of compounds A1 and A2 used. Composition resulting from the mixing of at least one lubricating oil with such a composition of associative and exchangeable polymers and use of this composition for lubricating a mechanical part.

14 Claims, 6 Drawing Sheets

(51) Int. Cl.
    *C08F 220/20*     (2006.01)
    *C08L 33/06*     (2006.01)
    *C08L 33/12*     (2006.01)
    *C08L 35/06*     (2006.01)
    *C08F 220/18*     (2006.01)
    *C08F 230/06*     (2006.01)
    *C08K 5/55*     (2006.01)

(52) U.S. Cl.
    CPC .......... *C08F 220/20* (2013.01); *C08F 230/06* (2013.01); *C08L 33/064* (2013.01); *C08L 33/066* (2013.01); *C08L 33/12* (2013.01); *C08L 35/06* (2013.01); *C08F 220/1818* (2020.02); *C08K 5/55* (2013.01)

(58) Field of Classification Search
    CPC .. C08L 43/00; C08F 212/08; C08F 220/1812; C08F 220/1818; C08F 220/20; C08K 5/55; C10M 155/00; C10M 157/00; C10M 161/00; C10M 2227/061; C10M 2227/062; C10M 2205/04; C10M 2209/084; C10M 2203/1025; C10N 2020/02
See application file for complete search history.

(56) References Cited

U.S. PATENT DOCUMENTS

| | | | |
|---|---|---|---|
| 11,319,503 B2* | 5/2022 | Derouineau | C10M 169/044 |
| 2012/0135899 A1* | 5/2012 | Kocsis | C10M 161/00 |
| | | | 508/290 |
| 2017/0008989 A1* | 1/2017 | Nguyen | C08F 220/20 |
| 2017/0009176 A1 | 1/2017 | Nguyen et al. | |
| 2018/0023028 A1 | 1/2018 | Nicolay et al. | |
| 2018/0155463 A1* | 6/2018 | Zhang | C08F 2/14 |
| 2019/0382679 A1* | 12/2019 | Derouineau | C10M 155/04 |
| 2020/0399415 A1* | 12/2020 | Descroix | C08F 220/1804 |

OTHER PUBLICATIONS

May 28, 2019 International Preliminary Report on Patentability issued in International Patent Application No. PCT/FR2017/053188.

* cited by examiner

THERMOASSOCIATIVE AND EXCHANGEABLE COPOLYMERS, COMPOSITION COMPRISING SAME

The invention relates to a composition resulting from the mixing of at least one copolymer A1, resulting from the copolymerization of at least one monomer functionalized with diol functions with at least one styrene monomer, and of at least one compound A2 comprising at least two boronic ester functions. Such compositions have very varied rheological properties depending on the proportion of the compounds A1 and A2 used. The invention also relates to a composition resulting from the mixing of at least one lubricant oil with such a polymer composition and to the use of this composition for lubricating a mechanical part.

The field of the invention is that of exchangeable associative polymers and that of lubricants.

PRIOR ART

High molar mass polymers are widely used for increasing the viscosity of solutions in many fields, such as the petroleum, paper and water treatment industries, the mining industry, the cosmetics and textile industries and in general in all the industrial techniques using thickened solutions.

However, these high molecular mass polymers have the drawback of undergoing substantial irreversible degradation under mechanical stress when compared with the same polymers of smaller sizes. These shear stresses on high molar mass polymers lead to cleavages in the macromolecular chains. The polymer thus degraded undergoes a reduction in or disappearance of its thickening properties, and the viscosity of solutions containing it drops irreversibly. This loss of shear strength leads to degradation of the properties of solutions based on high molar mass polymers.

Patent applications WO2015/110642, WO2015/110643 and WO2016113229 disclose a composition resulting from the mixing of at least one copolymer A1 resulting from the copolymerization of at least one monomer functionalized with diol functions and of at least one compound A2 comprising at least two boronic ester functions. These compounds can associate, to optionally form a gel, and to exchange chemical bonds thermoreversibly. These additives have the advantage of reducing the drop in viscosity of the solution comprising them when the temperature increases. These polymer compositions have very varied rheological properties depending on the proportion of the compounds A1 and A2 used. They may also comprise a diol compound which makes it possible to better control the association of the two copolymers.

In particular, these polymer compositions may be added to a lubricant oil to lubricate a mechanical part. These copolymers make it possible to formulate lubricant compositions whose viscosity is better controlled when compared with the lubricant compositions of the prior art. In particular, when they are introduced into a base oil, these copolymers have a tendency to reduce the drop in viscosity of the mixture when the temperature increases. The presence of a diol compound in these lubricant compositions makes it possible to better modify their viscosity.

Lubricant compositions are compositions applied between surfaces, especially metal surfaces, of moving parts. They make it possible to reduce the friction and the wear between two parts in contact and in motion relative to each other. They also serve to dissipate part of the thermal energy generated by this friction. Lubricant compositions form a protective film between the surfaces of the parts onto which they are applied.

The compositions used for lubricating mechanical parts are generally formed from a base oil and additives. The base oil, which is especially of petroleum or synthetic origin, shows viscosity variations when the temperature is varied.

Specifically, when the temperature of a base oil increases, its viscosity decreases, and when the temperature of the base oil decreases, its viscosity increases. Now, in a hydrodynamic lubrication regime, the thickness of the protective film is proportional to its viscosity, and thus also depends on the temperature. A composition has good lubricant properties if the thickness of the protective film remains substantially constant irrespective of the conditions and the duration of use of the lubricant.

In an internal combustion engine, a lubricant composition may be subjected to external or internal temperature changes. The external temperature changes are due to variations in the temperature of the ambient air, for instance variations in temperature between summer and winter. The internal temperature changes result from the running of the engine. The temperature of an engine is lower during its start-up phase, especially in cold weather, than during prolonged use. Consequently, the thickness of the protective film may vary in these different situations.

There is therefore a need to provide a lubricant composition which has good lubricant properties and whose viscosity is sparingly subject to temperature variations.

It is known practice to add additives that improve the viscosity of a lubricant composition. The function of these additives is to modify the rheological behavior of the lubricant composition. They make it possible to promote greater stability of the viscosity over a temperature range within which the lubricant composition is used. For example, these additives limit the reduction in viscosity of the lubricant composition when the temperature rises, while at the same time limiting the increase in viscosity under cold conditions.

Additives for enhancing the viscosity (or additives for enhancing the viscosity index) ensure good lubrication by limiting the impact on the viscosity under cold conditions and by ensuring a minimum thickness of the film under hot conditions. The viscosity-enhancing additives currently used are polymers such as olefin copolymers (OCP) and polyalkyl methacrylates (PMA). These polymers have high molar masses. In general, the contribution of these polymers toward controlling the viscosity is proportionately greater the higher their molecular weight.

However, high molar mass polymers have the drawback of having poor permanent shear strength when compared with polymers of the same nature and of the same architecture but of smaller size.

Now, a lubricant composition is subjected to high shear stresses especially in internal combustion engines, where the friction surfaces have a very small separation and the pressure is exerted on the parts are high. These shear stresses on high molar mass polymers lead to cleavages in the macromolecular chains. The polymer thus degraded undergoes a reduction in its thickening properties, and the viscosity drops irreversibly. Permanent shear strength thus leads to degradation of the lubricant properties of the lubricant composition.

Finally, compositions have been sought which have better oxidation stability, in particular better resistance to oxidation by free radicals.

The compositions described in patent applications WO 2015/110642, WO 2015/110643 and WO 2016/113229 have very advantageous properties, as a result of their capacity to form thermoreversible associations. However, it has been found that, under certain conditions, especially high temperature conditions, the associative behavior of these copolymers reduced. In particular, a reduction in the viscosity index of lubricant compositions comprising them, and poorer resistance to cycling (which may be defined as the succession of sequences of raising and lowering of the temperature as is observed in an engine), leading to a loss of the lubricant properties over time, have been observed.

Thus, the Applicant set itself the objective of preparing novel copolymers which have improved properties when compared with the copolymers of the prior art.

This objective is achieved by means of novel rheological additives which can associate, optionally to form a gel, and can be thermoreversibly exchanged. In contrast with the base oil which becomes fluidized when the temperature increases, the additives of the present invention have the advantage of thickening the medium in which they are dispersed when the temperature increases, and they maintain this advantage at high temperatures, for instance up to 150° C. These additives show resistance to temperature increase when compared with the additives of the prior art.

Lubricant compositions comprising them show better stability of their cycling performance and better reproducibility of the lubricant properties over time.

This characteristic results from the combined use of two particular compounds, a copolymer bearing diol functions and styrene functions and a compound comprising boronic ester functions.

It is possible, by means of the compositions of the invention, to provide lubricant compositions which have good lubricant properties during the start-up phases of an engine (cold phase) and good lubricant properties when the engine is running at its service temperature (hot phase).

SUMMARY OF THE INVENTION

A first subject of the invention consists of a composition resulting from the mixing of at least
one polydiol random copolymer A1 comprising at least from 2 mol % to 50 mol % of at least one monomer M3 of general formula (X):

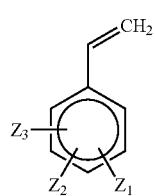

in which:
Z$_1$, Z$_2$ and Z$_3$, which may be identical or different, represent groups chosen from a hydrogen atom, a C1-C12 alkyl, and a group —OZ' or —C(O)—O—Z' with Z' being a C1-C12 alkyl, and
a compound A2 comprising at least two boronic ester functions.

According to a preferred embodiment of the invention, the random copolymer A1 results, directly or indirectly, from the copolymerization:

of at least one first monomer M1 of general formula (I):

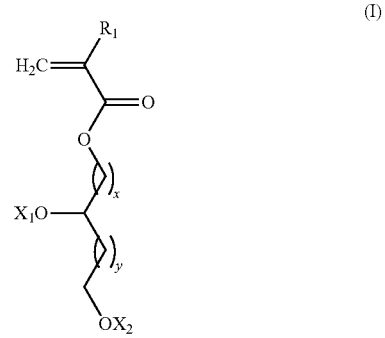

in which:
R$_1$ is chosen from the group formed by —H, —CH$_3$ and —CH$_2$—CH$_3$;
x is an integer ranging from 1 to 18 and preferably from 2 to 18;
y is an integer equal to 0 or 1;
X$_1$ and X$_2$, which may be identical or different, are chosen from the group formed by hydrogen, tetrahydropyranyl, methyloxymethyl, tert-butyl, benzyl, trimethylsilyl and t-butyldimethylsilyl;
or
X$_1$ and X$_2$ form, with the oxygen atoms, a bridge having the following formula

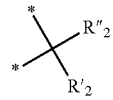

in which:
the asterisks (*) symbolize the bonds to oxygen atoms,
R'$_2$ and R''$_2$, which may be identical or different, are chosen from the group formed by hydrogen and a C$_1$-C$_{11}$ alkyl, preferably methyl;
or
X$_1$ and X$_2$ form, with the oxygen atoms, a boronic ester having the following formula:

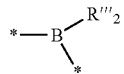

in which:
the asterisks (*) symbolize the bonds to oxygen atoms,
R'''$_2$ is chosen from the group formed by a C$_6$-C$_{30}$ aryl, a C$_7$-C$_{30}$ aralkyl and a C$_2$-C$_{30}$ alkyl, preferably a C$_6$-C$_{18}$ aryl;
with at least one second monomer M2 of general formula (II):

in which:
R$_2$ is chosen from the group formed by —H, —CH$_3$ and —CH$_2$—CH$_3$;
R$_3$ is chosen from the group formed by: —C(O)—O—R'$_3$;
—O—R'$_3$; —S—R'$_3$ and —C(O)—N(H)—R'$_3$ with R'$_3$ being a C$_1$-C$_{30}$ alkyl group,
and
with at least one third monomer M3 of general formula (X):

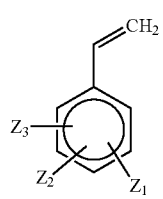

in which:
Z$_1$, Z$_2$ and Z$_a$, which may be identical or different, represent groups chosen from a hydrogen atom, a C1-C12 alkyl, and a group —OZ' or —C(O)—O—Z' with Z' being a C1-C12 alkyl, According to a preferred embodiment, the third monomer M3 is styrene.

According to a preferred embodiment, the random copolymer A1 results, directly or indirectly, from the copolymerization of at least one monomer M1 with at least two monomers M2 bearing different groups R$_3$ and at least one monomer M3.

According to a first preferred variant, the two monomers M2 of the random copolymer A1 have the general formula (II-B):

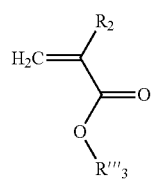

in which:
R$_2$ is chosen from the group formed by —H, —CH$_3$ and —CH$_2$—CH$_3$;
—R'''$_3$ is a C$_9$-C$_{30}$ alkyl group.

According to another preferred variant, one of the monomers M2 of the random copolymer A1 has the general formula (II-A):

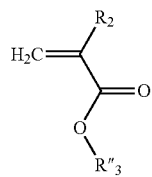

in which:
R$_2$ is chosen from the group formed by —H, —CH$_3$ and —CH$_2$—CH$_3$;
R''$_3$ is a C$_1$-C$_8$ alkyl group;
and the other monomer M2 of the random copolymer A1 has the general formula (II-B):

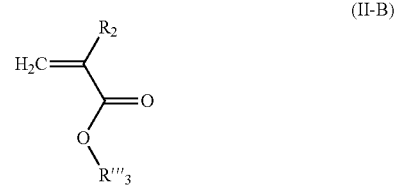

in which:
R$_2$ is chosen from the group formed by —H, —CH$_3$ and —CH$_2$CH$_3$;
R'''$_3$ is a C$_9$-C$_{30}$ alkyl group.

According to a preferred embodiment, the side chains of the random copolymer A1 have a mean length ranging from 8 to 20 carbon atoms, preferably from 9 to 18 carbon atoms.

According to a preferred embodiment, the random copolymer A1 has a molar percentage of monomer M3 of formula (X) in said copolymer ranging from 3% to 40% and more preferably ranging from 5% to 35%.

According to a preferred embodiment, the random copolymer A1 has a molar percentage of monomer M1 of formula (I) in said copolymer ranging from 1% to 30% and preferably from 5% to 25%.

According to a preferred embodiment, the random copolymer A1 has a number-average degree of polymerization ranging from 40 to 2000 and preferably from 40 to 1000.

According to a preferred embodiment, the random copolymer A1 has a polydispersity index (Ip) ranging from 1.05 to 4.0, preferably ranging from 1.10 to 3.8.

According to a first preferred embodiment, compound A2 is a compound of formula (III):

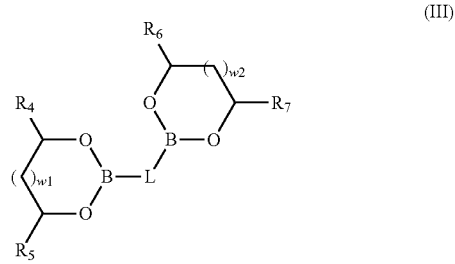

in which:
w$_1$ and w$_2$, which may be identical or different, are integers chosen between 0 and 1;
R$_4$, R$_5$, R$_6$ and R$_7$, which may be identical or different, represent a group chosen from a hydrogen atom, a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from: a hydroxyl, a group —OJ or —C(O)—O-J with J being a hydrocarbon-based group comprising from 1 to 24 carbon atoms;

L is a divalent bonding group chosen from the group formed by a $C_6$-$C_{18}$ aryl, a $C_7$-$C_{24}$ aralkyl and a $C_2$-$C_{24}$ hydrocarbon-based chain.

According to another preferred embodiment, compound A2 is a random copolymer resulting from the copolymerization
of at least one monomer M4 of formula (IV):

$$
\text{(IV)}
$$

in which:
- t is an integer equal to 0 or 1;
- u is an integer equal to 0 or 1;
- M and $R_8$ are identical or different divalent bonding groups, chosen from the group formed by a $C_6$-$C_{18}$ aryl, a $C_7$-$C_{24}$ aralkyl and a $C_2$-$C_{24}$ alkyl, preferably a $C_6$-$C_{18}$ aryl,
- X is a function chosen from the group formed by —O—C(O)—, —C(O)—O—, —C(O)—N(H)—, —N(H)—C(O)—, —S—, —N(H)—, —N($R'_4$)— and —O— with $R'_4$ being a hydrocarbon-based chain comprising from 1 to 15 carbon atoms;
- $R_9$ is chosen from the group formed by —H, —$CH_3$ and —$CH_2$—$CH_3$;
- $R_{10}$ and $R_{11}$, which may be identical or different, represent a group chosen from a hydrogen atom, a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from: a hydroxyl, a group —OJ or —C(O)—O-J with J being a hydrocarbon-based group comprising from 1 to 24 carbon atoms;

with at least one second monomer M5 of general formula (V):

$$
\text{(V)}
$$

in which:
- $R_{12}$ is chosen from the group formed by —H, —$CH_3$ and —$CH_2$—$CH_3$; $R_{13}$ is chosen from the group formed by a $C_6$-$C_{18}$ aryl, a $C_6$-$C_{18}$ aryl substituted with a group $R'_{13}$, —C(O)—O—$R'_{13}$, —O—$R'_{13}$, —S—$R'_{13}$ and —C(O)—N(H)—$R'_{13}$ with $R'_{13}$ being a $C_1$-$C_{30}$ alkyl group.

According to a preferred embodiment, at least one of the following three conditions is met:
- either, in formula (IV): u=1, $R_9$ is H and $R_8$ represents a $C_6$-$C_{18}$ aryl or a $C_7$-$C_{24}$ aralkyl and the double bond of the monomer M4 of formula (IV) is directly connected to the aryl group;

or, in formula (V): $R_{12}$ represents H and $R_{13}$ is chosen from the group formed by a $C_6$-$C_{18}$ aryl and a $C_6$-$C_{18}$ aryl substituted with a group $R'_{13}$ with $R'_{13}$ being a $C_1$-$C_{25}$ alkyl group and the double bond of the monomer M5 of formula (V) is directly connected to the aryl group.

or, copolymer A2 comprises at least one third monomer M3 of formula (X)

$$
\text{(X)}
$$

in which:
- $Z_1$, $Z_2$ and $Z_3$, which may be identical or different, represent groups chosen from a hydrogen atom, a $C_1$-$C_{12}$ alkyl, and a group —OZ' or —C(O)—O—Z' with Z' being a $C_1$-$C_{12}$ alkyl.

Advantageously, when A2 comprises a third monomer M3 of formula (X), this monomer M3 is styrene.

Advantageously, the boronic ester random copolymer A2 has a molar percentage of styrene monomer(s), advantageously of styrene, of formula (IV), (V) and/or (X), in said copolymer ranging from 2 mol % to 50 mol %, preferentially from 3 mol % to 40 mol % and more preferably from 5 mol % to 35 mol %.

According to an advantageous embodiment, a chain formed by the sequence of groups $R_{10}$, M, X and $(R_8)_u$ with u equal to 0 or 1 of the monomer of formula (IV) has a total number of carbon atoms ranging from 8 to 38 and preferably from 10 to 26.

According to an advantageous embodiment, the side chains of the copolymer A2 have a mean length of greater than or equal to 8 carbon atoms, preferably from 11 to 16 carbon atoms.

According to an advantageous embodiment, the copolymer A2 has a molar percentage of monomer of formula (IV) in said copolymer ranging from 0.25% to 30% and preferably from 1% to 25%.

According to an advantageous embodiment, the copolymer A2 has a number-average degree of polymerization ranging from 50 to 1500 and preferably from 50 to 800.

According to a preferred embodiment, the random copolymer A2 has a polydispersity index (Ip) ranging from 1.04 to 3.54, preferably ranging from 1.10 to 3.10.

According to a preferred embodiment, the content of copolymer A1 ranges from 0.1% to 50% by weight relative to the total weight of the composition.

According to a preferred embodiment, the content of compound A2 ranges from 0.1% to 50% by weight relative to total weight of the composition.

According to a preferred embodiment, the mass ratio between copolymer A1 and compound A2 (ratio A1/A2) ranges from 0.005 to 200, preferably from 0.05 to 20 and even more preferably from 0.1 to 10.

According to a preferred embodiment, the copolymer A1 has been obtained via a process comprising at least:
- one step of radical polymerization controlled by reversible addition-fragmentation chain transfer in the presence of a transfer agent of thiocarbonylthio type.

A more preferred embodiment, the copolymer A1 has been obtained via a process comprising at least, after the polymerization:
one step of aminolysis of the thiocarbonylthio residue to thiol, followed by
Michael addition on an acrylate to transform the thiol into a thioether.

According to a preferred embodiment, the composition also comprises at least one exogenous compound A4 chosen from 1,2-diols and 1,3-diols.

According to a preferred embodiment, the molar percentage of exogenous compound A4 relative to the boronic ester functions of the random copolymer A2 ranges from 0.025% to 5000%, preferably from 0.1% to 1000%, even more preferably from 0.5% to 500% and even more preferably from 1% to 150%.

According to a preferred embodiment, the exogenous compound A4 has the general formula (VI):

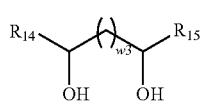

with:
$w_3$ being an integer equal to 0 or 1;
$R_{14}$ and $R_{15}$, which may be identical or different, chosen from the group formed by hydrogen and a hydrocarbon-based group containing from 1 to 24 carbon atoms.

A subject of the invention is also a process for preparing a composition as described above, which comprises the mixing of at least one polydiol random copolymer A1 and of at least one compound A2 comprising at least two boronic ester functions, in which the copolymer A1 has been obtained via a process comprising at least:
one step of radical polymerization controlled by reversible addition-fragmentation chain transfer in the presence of a transfer agent of thiocarbonylthio type.

According to a preferred embodiment of the process, the copolymer A1 has been obtained via a process comprising at least, after the polymerization:
one step of aminolysis of the thiocarbonylthio residue to thiol, followed by
Michael addition on an acrylate to transform the thiol into a thioether.

The invention also relates to a lubricant composition resulting from the mixing of at least:
one lubricant oil; and
one composition as defined above and as detailed in the description below.

According to a preferred embodiment, the lubricant oil is chosen from oils of group I, of group II, of group III, of group IV and of group V of the API classification, and a mixture thereof.

According to a preferred embodiment, the lubricant composition results from the mixing also with a functional additive chosen from the group formed by antioxidants, detergents, anti-wear additives, extreme-pressure additives, viscosity-index-enhancing polymers, flow-point improvers, antifoams, anticorrosion additives, thickeners, dispersants, friction modifiers, and mixtures thereof.

The invention also relates to a process for modifying the viscosity of a lubricant composition, the process comprising at least:
the provision of a composition as defined above and as detailed in the description below,
the mixing of this composition with a lubricant oil.

DETAILED DESCRIPTION

Additive Composition According to the Invention:
One subject of the present invention is a composition of thermoreversibly associative and exchangeable compounds, this composition resulting from the mixing of at least
one polydiol random copolymer A1 as described below or as may especially be obtained via one of the processes described below, this polymer comprising optionally substituted benzyl groups;
one compound A2 comprising at least two boronic ester functions.

This additive composition makes it possible to control and modify the rheological behavior of a medium into which it is added. The medium may be a hydrophobic medium, especially an apolar medium, such as a solvent, a mineral oil, a natural oil or a synthetic oil.

Polydiol Random Copolymers A1
The polydiol random copolymer A1 comprises at least one monomer M3, of general formula (X) defined above. The other monomers included in the composition of the polydiol random copolymer A1 must be compatible with copolymerization with monomers M3.

According to a preferred embodiment, the polydiol random copolymer A1 results, directly or indirectly, from the copolymerization of at least one first monomer M1 bearing diol functions, of at least one second monomer M2, different in chemical structure from that of the monomer M1, and of at least one third monomer M3, chosen from styrene and styrene derivatives. The term "results directly or indirectly" means that the process for preparing the copolymer may comprise one or more steps other than copolymerization, such as a deprotection step. The copolymerization may especially be optionally followed by a step of deprotecting the diol functions.

Throughout the description, the following expressions are used without preference and equivalently: "the polydiol random copolymer A1 results, directly or indirectly, from the copolymerization" and "the polydiol random copolymer A1 results from the copolymerization".

The term "copolymer" means a linear or branched oligomer or macromolecule having a sequence formed from several repeating units (or monomer units), of which at least two units have a different chemical structure.

The term "monomer unit" or "monomer" means a molecule that is capable of being converted into an oligomer or a macromolecule by combination with itself or with other molecules of the same type. A monomer denotes the smallest constituent unit whose repetition leads to an oligomer or a macromolecule.

The term "random copolymer" means an oligomer or a macromolecule in which the sequential distribution of the monomer units obeys known statistical laws. For example, a copolymer is said to be random when it is formed by monomer units whose distribution is a Markovian distribution. A schematic random polymer (P1) is illustrated in FIG. 1. The distribution of the monomer units in the polymer chain depends on the reactivity of the polymerizable functions of the monomers and on the relative concentration of the monomers. The polydiol random copolymers of the invention are different from block copolymers and gradient copolymers. The term "block" denotes a part of a copolymer comprising several identical or different monomer units and which has at least one constitutional or configurational feature allowing it to be distinguished from its adjacent parts. A schematic random polymer (P3) is illustrated in FIG. 1. A gradient copolymer denotes a copolymer of at least two monomer units of different structures, the monomer composition of which changes gradually along the polymer chain, thus gradually passing from one end of the polymer chain which is rich in one monomer unit, to the other end which is rich in the other comonomer. A schematic gradient polymer (P2) is illustrated in FIG. 1.

The term "copolymerization" means a process which makes it possible to convert a mixture of at least two monomer units of different chemical structures into an oligomer or a copolymer.

In the rest of the present patent application, "B" represents a boron atom.

The term "$C_i$-$C_j$ alkyl" means a linear or branched, saturated hydrocarbon-based chain, comprising from i to j carbon atoms. For example, the term "$C_1$-$C_{10}$ alkyl" means a linear or branched, saturated hydrocarbon-based chain comprising from 1 to 10 carbon atoms.

The term "$C_x$-$C_y$ aryl" means a functional group which is derived from an aromatic hydrocarbon-based compound comprising from x to y carbon atoms. This functional group may be monocyclic or polycyclic. By way of illustration, a $C_6$-$C_{18}$ aryl may be phenyl, naphthalene, anthracene, phenanthrene and tetracene.

The term "$C_x$-$C_y$ alkenyl" means a linear or branched hydrocarbon-based chain including at least one unsaturation, preferably a carbon-carbon double bond, and comprising from x to y carbon atoms.

The term "$C_x$-$C_y$ aralkyl" means an aromatic, preferably monocyclic, hydrocarbon-based compound substituted with at least one linear or branched alkyl chain and in which the total number of carbon atoms in the aromatic ring and in its substituents ranges from x to y carbon atoms. By way of illustration, a $C_7$-$C_{18}$ aralkyl may be chosen from the group formed by benzoyl, tolyl and xylyl.

The term "$C_x$-$C_y$ aryl substituted with a group Y" means an aromatic, preferably monocyclic, hydrocarbon-based compound comprising from x to y carbon atoms, at least one carbon atom of the aromatic ring of which is substituted with a group Y.

The term "Hal" or "halogen" means a halogen atom chosen from the group formed by chlorine, bromine, fluorine and iodine.

Monomer M1

The first monomer M1 of the polydiol random copolymer (A1) of the invention has the general formula (I):

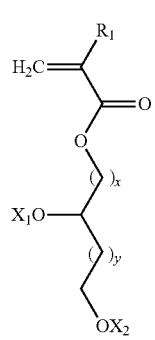

(I)

in which:
R$_1$ is chosen from the group formed by —H, —CH$_3$ and —CH$_2$—CH$_3$, preferably —H and —CH$_3$;
x is an integer ranging from 1 to 18, preferably ranging from 2 to 18, more preferably from 3 to 8 and even more preferably x is equal to 4;
y is an integer equal to 0 or 1; preferably, y is equal to 0;
X$_1$ and X$_2$, which may be identical or different, are chosen from the group formed by hydrogen, tetrahydropyranyl, methyloxymethyl, tert-butyl, benzyl, trimethylsilyl and t-butyldimethylsilyl;

or

X$_1$ and X$_2$ form, with the oxygen atoms, a bridge having the following formula

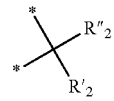

in which:
the asterisks (*) symbolize the bonds to oxygen atoms,
R'$_2$ and R''$_2$, which may be identical or different, are chosen from the group formed by hydrogen and a C$_1$-C$_{11}$ alkyl group;

or

X$_1$ and X$_2$ form, with the oxygen atoms, a boronic ester having the following formula:

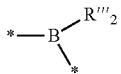

in which:
the asterisks (*) symbolize the bonds to oxygen atoms,
R'''$_2$ is chosen from the group formed by a C$_6$-C$_{30}$ aryl, a C$_7$-C$_{30}$ aralkyl and a C$_2$-C$_{30}$ alkyl, preferably a C$_6$-C$_{18}$ aryl, more preferably phenyl.

Preferably, when R'$_2$ and R''$_2$ are a C$_1$-C$_{11}$ alkyl group, the hydrocarbon-based chain is a linear chain. Preferably, the C$_1$-C$_{11}$ alkyl group is chosen from the group formed by methyl, ethyl, n-propyl, n-butyl, n-pentyl, n-hexyl, n-heptyl, n-octyl, n-nonyl, n-decyl and n-undecyl. More preferably, the C$_1$-C$_{11}$ alkyl group is methyl.

Preferably, when R'''$_2$ is a C$_2$-C$_{30}$ alkyl group, the hydrocarbon-based chain is a linear chain.

Among the monomers of formula (I), the monomers corresponding to formula (I-A) are among the preferred:

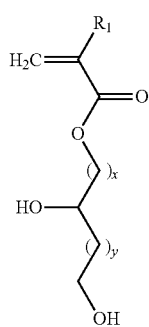

(I-A)

in which:
  $R_1$ is chosen from the group formed by —H, —CH$_3$ and —CH$_2$—H$_3$, preferably —H and —CH$_3$;
  x is an integer ranging from 1 to 18, preferably ranging from 2 to 18, more preferably from 3 to 8 and even more preferably x is equal to 4;
  y is an integer equal to 0 or 1; preferably, y is equal to 0.

Among the monomers of formula (I), the monomers corresponding to formula (I-B) are among the preferred:

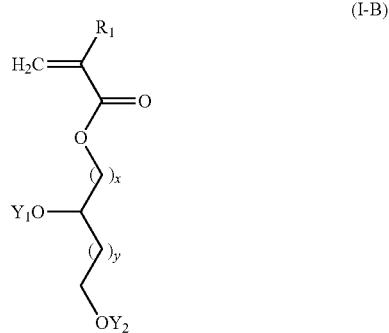

(I-B)

in which:
  $R_1$ is chosen from the group formed by —H, —CH$_3$ and —CH$_2$—CH$_3$, preferably —H and —CH$_3$;
  x is an integer ranging from 1 to 18, preferably ranging from 2 to 18, more preferably from 3 to 8 and even more preferably x is equal to 4;
  y is an integer equal to 0 or 1; preferably, y is equal to 0;
  $Y_1$ and $Y_2$, which may be identical or different, are chosen from the group formed by tetrahydropyranyl, methyloxymethyl, tert-butyl, benzyl, trimethylsilyl and t-butyldimethylsilyl; or
  $Y_1$ and $Y_2$ form, with the oxygen atoms, a bridge having the following formula:

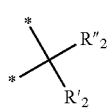

in which:
  the asterisks (') symbolize the bonds to oxygen atoms,
  $R'_2$ and $R''_2$, which may be identical or different, are chosen from the group formed by hydrogen and a $C_1$-$C_1$ alkyl group;
or
  $Y_1$ and $Y_2$ form, with the oxygen atoms, a boronic ester having the following formula:

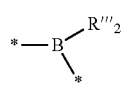

in which:
  the asterisks (*) symbolize the bonds to oxygen atoms,
  $R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl, more preferably phenyl.

Preferably, when $R'_2$ and $R''_2$ are a $C_1$-$C_{11}$ alkyl group, the hydrocarbon-based chain is a linear chain. Preferably, the $C_1$-$C_{11}$ alkyl group is chosen from the group formed by methyl, ethyl, n-propyl, n-butyl, n-pentyl, n-hexyl, n-heptyl, n-octyl, n-nonyl, n-decyl and n-undecyl. More preferably, the $C_1$-$C_{11}$ alkyl group is methyl.

Preferably, when $R'''_2$ is a $C_2$-$C_{30}$ alkyl group, the hydrocarbon-based chain is a linear chain.

The synthesis of the polydiol random copolymer (A1) may comprise the copolymerization of monomers (I-B) in protected form with other comonomers, followed by deprotection of the diol functions of the monomers (I-B).

Production of the Monomer M1

The monomer M1 of general formula (I-A) is obtained by deprotection of the alcohol functions of the monomer of general formula (I-B) according to reaction scheme 1 below:

Scheme 1

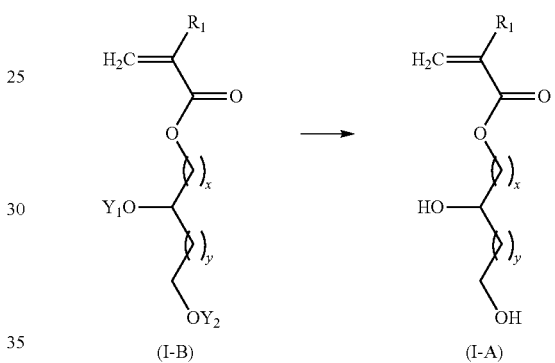

with $R_1$, $Y_1$, $Y_2$, x and y as defined in the general formula (I-B) described above.

The reaction for the deprotection of the diol functions of the monomer of general formula (I-B) is well known to a person skilled in the art. Said person knows how to adapt the deprotection reaction conditions as a function of the nature of the protecting groups $Y_1$ and $Y_2$.

The monomer M1 of general formula (I-B) may be obtained by reaction of a compound of general formula (I-c) with an alcohol compound of general formula (I-b) according to reaction scheme 2 below:

Scheme 2

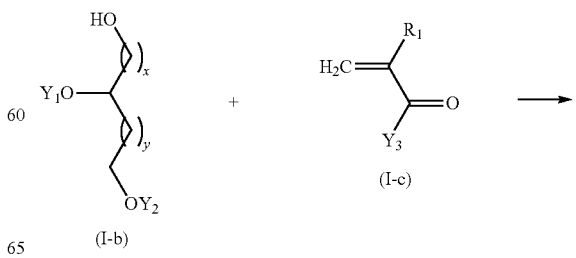

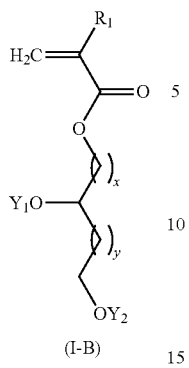

(I-B)

in which:
Y$_3$ is chosen from the group formed by a halogen atom, preferably chlorine, —OH and O—C(O)—R'$_1$ with R'$_1$ chosen from the group formed by —H, —CH$_3$ and —CH$_2$—CH$_3$, preferably —H and —CH$_3$;

R$_1$, Y$_1$, Y$_2$, x and y have the same meaning as that given in the general formula (I-B).

These coupling reactions are known to those skilled in the art.

The compound of general formula (I-c) is commercially available from the suppliers: Sigma-Aldrich® and Alfa Aesar®.

The alcohol compound of general formula (I-b) is obtained from the corresponding polyol of formula (I-a) by protection of the diol functions according to reaction scheme 3 below:

Scheme 3

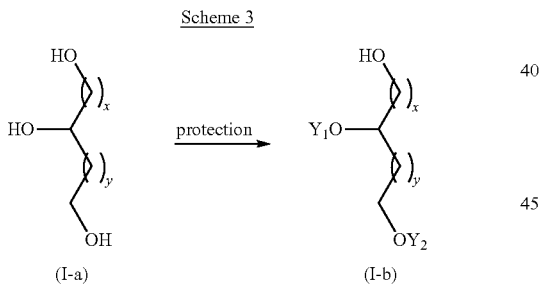

with x, y, Y$_1$ and Y$_2$ as defined in the general formula (I-B).

The reaction for the protection of the diol functions of the compound of general formula (I-a) is well known to a person skilled in the art. Said person knows how to adapt the protection reaction conditions as a function of the nature of the protecting groups Y$_1$ and Y$_2$ used.

The polyol of general formula (I-a) is commercially available from the suppliers: Sigma-Aldrich® and Alfa Aesar®.

Examples of synthesis of the monomers M1 are illustrated in the experimental section of patent applications WO2015/110642, WO2015/110643 and WO2016113229.

Monomer M2

The second monomer of the copolymer of the invention has the general formula (II):

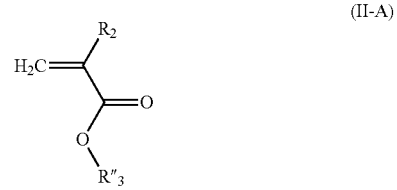

in which:
R$_2$ is chosen from the group formed by —H, —CH$_3$ and —CH$_2$—CH$_3$, preferably —H and —CH$_3$;
R$_3$ is chosen from the group formed by a C$_6$-C$_{18}$ aryl group, a C$_6$-C$_{18}$ aryl substituted with a group R'$_3$, —C(O)—O—R'$_3$; —O—R'$_3$, —S—R'$_3$ and —C(O)—N(H)—R'$_3$, with R'$_3$ being a C$_1$-C$_{30}$ alkyl group.
Preferably, R'$_3$ is a C$_1$-C$_{30}$ alkyl group, the hydrocarbon-based chain of which is linear.

Among the monomers of formula (II), the monomers corresponding to formula (II-A) are among the preferred:

(II-A)

in which:
R$_2$ is chosen from the group formed by —H, —CH$_3$ and —CH$_2$—CH$_3$, preferably —H and —CH$_3$;
R"$_3$ is a C$_1$-C$_8$ alkyl group;
The term "C$_1$-C$_8$ alkyl group" means a linear or branched, saturated hydrocarbon-based chain containing from 1 to 8 carbon atoms. Preferably, the hydrocarbon-based chain is linear.

Among the monomers of formula (II), the monomers corresponding to formula (II-B) are also among the preferred:

(II-B)

in which:
R$_2$ is chosen from the group formed by —H, —CH$_3$ and —CH$_2$—CH$_3$, preferably —H and —CH$_3$;
R'''$_3$ is a C$_9$-C$_{30}$ alkyl group.
The term "C$_9$-C$_{30}$ alkyl group" means a linear or branched, saturated hydrocarbon-based chain containing from 9 to 30 carbon atoms. Preferably, the hydrocarbon-based chain is linear.

Production of the Monomer M2

The monomers of formulae (II), (II-A) and (II-B) are well known to those skilled in the art. They are sold by Sigma-Aldrich® and TCI®.

Monomer M3

The third monomer of the random copolymer of the invention has the general formula (X):

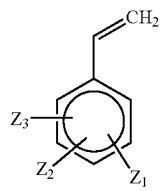

(X)

in which:
Z$_1$, Z$_2$ and Z$_3$, which may be identical or different, represent groups chosen from a hydrogen atom, a C$_1$-C$_{12}$ alkyl, and a group —OZ' or —C(O)—O—Z' with Z' being a C$_1$-C$_{12}$ alkyl.

The term "C$_1$-C$_{12}$ alkyl group" means a linear or branched, saturated hydrocarbon-based chain containing from 1 to 12 carbon atoms. Preferably, the hydrocarbon-based chain is linear. Preferably, the hydrocarbon-based chain comprises from 1 to 6 carbon atoms.

Advantageously, Z$_1$, Z$_2$ and Z$_3$, which may be identical or different, represent groups chosen from a hydrogen atom, a C$_1$-C$_4$ alkyl, and a group —OZ' or —C(O)—O—Z' with Z' being a C$_1$-C$_6$ alkyl.

More preferably, Z$_1$, Z$_2$ and Z$_2$, which may be identical or different, represent groups chosen from a hydrogen atom, a C$_1$-C$_4$ alkyl, and a group —OZ or —C(O)—O—Z' with Z' being a C$_1$-C$_4$ alkyl.

Among the preferred monomers M3, mention may be made of: styrene, para-tert-butylstyrene, para-methoxystyrene, para-acetoxystyrene and 2,4,6-trimethylstyrene.

According to a preferred embodiment, M3 is styrene.

Production of the Monomer M3

Certain monomers of formula (X), such as styrene, para-tert-butylstyrene, para-methoxystyrene, para-acetoxystyrene and 2,4,6-trimethylstyrene, are well known to those skilled in the art. They are sold especially by Sigma-Aldrich®. Other monomers may be prepared from these commercial monomers via synthetic methods that are well known to those skilled in the art.

Preferred Polydiol Copolymers

In one embodiment, a preferred random copolymer results from the copolymerization of at least:
one first monomer M1 of general formula (I) as described previously; especially of general formula (I-A) as described previously;
one second monomer M2 of formula (II) as described previously, in which R$_2$ is —CH$_3$ and R$_3$ is a group —C(O)—O—R'$_3$ with —R'$_3$ being a C$_1$-C$_{30}$ alkyl;
one third monomer M3 of general formula (X) as described previously; especially styrene.

In another embodiment, a preferred random copolymer results from the copolymerization of at least:
one first monomer M1 of general formula (I) as described previously; especially of general formula (I-A) as described previously,
one second monomer M2 of formula (II-B) as described previously;
one third monomer M2 of formula (II-B) as described previously, which is different from the first monomer of formula (II-B); and
one fourth monomer M3 of general formula (X) as described previously, especially styrene.

According to this other embodiment, a preferred random copolymer results from the copolymerization of at least:
one first monomer M1 of general formula (i) as described previously; especially of general formula (I-A) as described previously;
one second monomer M2 of formula (II-8) in which R$_2$ is —CH$_3$ and R'''$_3$ is a C$_9$-C$_{30}$ alkyl group, preferably a linear C$_9$-C$_{30}$ alkyl and better still a linear C$_9$-C$_{15}$ alkyl;
one third monomer M2 of formula (II-B), different from the second monomer of formula (II-B), in which R$_2$ is —CH$_3$ and R'''$_3$ is a C$_9$-C$_{30}$ alkyl group, preferably a linear C$_9$-C$_{30}$ alkyl, better still a linear C$_{16}$-C$_{24}$ alkyl; and
one fourth monomer M3 of general formula (X) as described previously, especially styrene.

According to this embodiment, a preferred random copolymer results from the copolymerization of at least:
one first monomer M1 of general formula (i) as described previously; especially of general formula (I-A) as described previously,
one second monomer M2 chosen from the group formed by n-decyl methacrylate and n-dodecyl methacrylate;
one third monomer M2 chosen from the group formed by palmityl methacrylate, stearyl methacrylate, arachidyl methacrylate and behenyl methacrylate,
optionally, one fourth monomer M3 of general formula (X) as described previously, especially styrene.

In another embodiment, a preferred random copolymer results from the copolymerization of at least:
one first monomer M1 of general formula (I) as described previously; especially of general formula (I-A) as described previously;
one second monomer M2 of formula (II-A) as described previously; and
one third monomer M2 of formula (II-B) as described previously,
one fourth monomer M3 of general formula (X) as described previously, especially styrene.

According to this other embodiment, a preferred random copolymer results from the copolymerization of at least:
one first monomer M1 of general formula (I) as described previously; especially of general formula (I-A) as described previously;
one second monomer M2 of formula (II-A) in which R$_2$ is —CH$_3$ and R'''$_3$ is a C$_1$-C$_8$ alkyl group, preferably a linear C$_1$-C$_8$ alkyl;
one third monomer M2 of formula (II-B) in which R$_2$ is —CH$_3$ and R'''$_3$ is a C$_9$-C$_{30}$ alkyl group, preferably a linear C$_9$-C$_{30}$ alkyl;
one fourth monomer M3 of general formula (X) as described previously, especially styrene.

According to this embodiment, a preferred random copolymer results from the copolymerization of at least:
one first monomer M1 of general formula (I) as described previously; especially of general formula (I-A) as described previously;
one second monomer M2 which is n-octyl methacrylate;
one third monomer M2 chosen from the group formed by palmityl methacrylate, stearyl methacrylate, arachidyl methacrylate and behenyl methacrylate,
optionally, one fourth monomer M3 of general formula (X) as described previously, especially styrene.

Process for Obtaining the Polydiol Copolymers

A person skilled in the art is capable of synthesizing the polydiol random copolymers A1 on the basis of his general knowledge.

The copolymerization may be initiated in bulk or in solution in an organic solvent with free-radical-generating compounds. For example, the copolymers of the invention are obtained via the known processes of radical copolymerization, especially controlled radical copolymerization, such as the method known as reversible addition-fragmentation chain transfer (RAFT) controlled radical polymerization and the method known as atom-transfer radical polymerization (ATRP). Conventional radical polymerization and telomerization may also be employed to prepare the polymers of the invention (Moad, G.; Solomon, D. H., The Chemistry of Radical Polymerization. 2nd ed.; Elsevier Ltd: 2006; page 639; Matyaszewski, K.; Davis, T. P. Handbook of Radical Polymerization; Wiley-Interscience: Hoboken, 2002; page 936).

According to a preferred embodiment, the copolymerization is performed by conventional radical synthesis, without an RAFT chain-transfer agent.

The polydiol random copolymer A1 is prepared according to a preparation process which comprises at least one polymerization step (a) in which are placed in contact at least:
  i) one first monomer M1 of general formula (I) as described previously;
  ii) at least one second monomer M2 of formula (II) as described previously;
  iii) at least one third monomer M3 of general formula (X) as described previously;
  iv) at least one source of free radicals.

In one embodiment, the process may also comprise v) at least one chain-transfer agent.

The term "a source of free radicals" means a chemical compound for generating a chemical species bearing one or more unpaired electrons in its outer shell. A person skilled in the art can use any source of free radicals known per se and suited to polymerization processes, especially controlled radical polymerization processes. Among the sources of free radicals that are preferred, by way of illustration, are benzoyl peroxide, tert-butyl peroxide, diazo compounds such as azobisisobutyronitrile, peroxygenated compounds such as persulfates or hydrogen peroxide, redox systems such as the oxidation of $Fe^{2+}$, persulfate/sodium metabisulfite mixtures, or ascorbic acid/hydrogen peroxide, or alternatively compounds that can be cleaved photochemically or by ionizing radiation, for example ultraviolet rays, or by beta or gamma radiation.

The term "chain-transfer agent" means a compound whose purpose is to ensure homogeneous growth of macromolecular chains via reversible transfer reactions between growing species, i.e. polymer chains terminated with a carbon-based radical, and dormant species, i.e. polymer chains terminated with a transfer agent. This reversible transfer process makes it possible to control the molecular masses of copolymers thus prepared. Preferably, in the process of the invention, the chain-transfer agent comprises a thiocarbonylthio group —S—C(=S)—. As illustrations of chain-transfer agents, mention may be made of dithioesters, trithiocarbonates, xanthates and dithiocarbamates. A preferred transfer agent is cumyl dithiobenzoate or 2-cyano-2-propyl benzodithioate.

The term "chain-transfer agent" also means a compound whose purpose is to limit the growth of macromolecular chains undergoing formation by addition of monomer molecules and to initiate new chains, which makes it possible to limit the final molecular masses, or even to control them. Such a type of transfer agent is used in telomerization. A preferred transfer agent is cysteamine.

In one embodiment, the process for preparing a polydiol random copolymer comprises:

at least one polymerization step (a) as defined above, in which the monomers M1 and M2 are chosen with $X_1$ and $X_2$ representing hydrogen.

In one embodiment, the polymerization step (a) comprises the placing in contact of at least one monomer M1 with at least two monomers M2 bearing different groups $R_3$ and at least one monomer M3, preferably styrene.

According to one embodiment (when a radical polymerization has been performed with an RAFT chain-transfer agent), after the direct synthesis of the polymer containing the diol functions, the process comprises a step of removing the RAFT chain end by aminolysis followed by Michael addition.

The preferences and definitions described for the general formulae (I), (I-A), (I-B), (II-A), (II-B) and (X) also apply to the processes described above.

Properties of the Polydiol Copolymers A1

The polydiol random copolymers A1 are linear copolymers. Alternatively, certain monomers might give access to comb copolymers. The term "comb copolymers" means a copolymer bearing a main chain (also referred to as a backbone) and side chains. The side chains hang on either side of the main chain. The length of each side chain is less than the length of the main chain. FIG. 2 schematically represents a comb polymer.

The copolymers A1 have a backbone of polymerizable functions, especially a backbone of methacrylate functions and styrene functions, and a mixture of hydrocarbon-based side chains optionally substituted with diol functions.

The monomers of formulae (I), (II) and (X) bear polymerizable functions whose reactivity leads to the formation of copolymers in which the monomers bearing diol functions are randomly distributed along the backbone of the copolymer.

The polydiol random copolymers A1 have the advantage of being sensitive to external stimuli, such as temperature, pressure and shear rate; this sensitivity is reflected by a change in properties. In response to a stimulus, the conformation in space of the copolymer chains is modified and the diol functions are made more or less accessible to association reactions, which may generate crosslinking, and also to exchange reactions. These association and exchange processes are reversible. The random copolymer A1 is a heat-sensitive copolymer, i.e. It is sensitive to changes in temperature.

Advantageously, the side chains of the polydiol random copolymer A1 have a mean length ranging from 8 to 20 carbon atoms, preferably from 9 to 18 carbon atoms. The term "mean length of the side chain" means the mean length of the side chains of the monomers M1 of formula (I) and M2 of formula (II) included in the constitution of the copolymer. The side chains derived from the styrene monomer(s) are not taken into account in the calculation of the mean lengths of the side chains. A person skilled in the art knows how to obtain this mean length by appropriately selecting the types and ratio of monomers constituting the polydiol random copolymer. The choice of this mean chain length makes it possible to obtain a polymer that is soluble in a hydrophobic medium, irrespective of the temperature at which the copolymer is dissolved. The polydiol random copolymer A1 is thus miscible in a hydrophobic medium. The term "hydrophobic medium" means a medium that has no affinity or that has very little affinity for water, i.e. it is immiscible with water or with an aqueous medium.

Advantageously, the polydiol random copolymer A1 has a molar percentage of monomer M1 of formula (I) in said copolymer ranging from 1% to 30% and preferably from 5% to 25%.

Advantageously, the polydiol random copolymer A1 has a molar percentage of monomer M3 of formula (X), advantageously of styrene, in said copolymer ranging from 3% to 40% and more preferably ranging from 5% to 35%.

In a preferred embodiment, the polydiol random copolymer A1 has a molar percentage of monomer M1 of formula (I) in said copolymer ranging from 1% to 30%, preferably from 5% to 25%, a molar percentage of monomer(s) M2 of formula (II-B) in said copolymer ranging from 0.1% to 95%, preferably from 5% to 80%, and a molar percentage of monomer M3 of formula (X), advantageously of styrene, in said copolymer ranging from 3% to 40%, more preferably ranging from 5% to 35%.

In another preferred embodiment, the polydiol random copolymer A1 has a molar percentage of monomer M1 of formula (I) in said copolymer ranging from 1% to 30%, preferably from 5% to 25%, a molar percentage of monomer M2 of formula (II-A) in said copolymer ranging from 8% to 92%, a molar percentage of monomer M2 of formula (II-B) in said copolymer ranging from 0.1% to 62%, and a molar percentage of monomer M3 of formula (X), advantageously of styrene, in said copolymer ranging from 3% to 40%, more preferably ranging from 5% to 35%. The molar percentage of monomers in the copolymer results directly from the adjustment of the amounts of monomers used for the synthesis of the copolymer.

Advantageously, the polydiol random copolymer A1 has a number-average degree of polymerization ranging from 40 to 2000 and preferably from 40 to 1000. In a known manner, the degree of polymerization is controlled using a controlled radical polymerization technique, a telomerization technique or by adjusting the amount of the source of free radicals when the copolymers of the invention are prepared by conventional radical polymerization.

Advantageously, the polydiol random copolymer A1 has a polydispersity index (Ip) ranging from 1.05 to 4.0, preferably ranging from 1.10 to 3.8. The polydispersity index is obtained by size exclusion chromatography measurement using poly(methyl methacrylate) calibration.

Advantageously, the polydiol random copolymer A1 has a number-average molar mass ranging from 5000 to 400 000 g/mol, preferably from 10 000 to 200 000 g/mol, the number-average molar mass being obtained by size exclusion chromatography measurement using poly(methyl methacrylate) calibration.

The size exclusion chromatography measurement method using poly(methyl methacrylate) calibration is described in the publication (Fontanille, M.; Gnanou, Y., Chimie et physico-chimie des polymbres [Chemistry and physical chemistry of polymers] 2nd ed.; Dunod: 2010; page 546).

Compound A2

Boronic Diester Compound A2

In one embodiment, compound A2 comprising two boronic ester functions has the general formula (III):

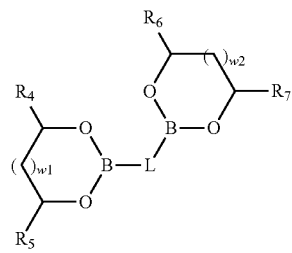

in which:
w$_1$ and w$_2$, which may be identical or different, are integers equal to 0 or 1,
R$_4$, R$_5$, R$_6$ and R$_7$, which may be identical or different, are chosen from the group formed by hydrogen and a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from a hydroxyl and a group —OJ or —C(O)—O-J with J being a hydrocarbon-based group comprising from 1 to 24 carbon atoms;
L is a divalent bonding group chosen from the group formed by a C$_6$-C$_{18}$ aryl, a C$_7$-C$_{24}$ aralkyl and a C$_2$-C$_{24}$ hydrocarbon-based chain, preferably a C$_6$-C$_{18}$ aryl.

The term "hydrocarbon-based group comprising from 1 to 30 carbon atoms" means a linear, branched or cyclic alkyl group comprising from 1 to 30 carbon atoms, a linear, branched or cyclic alkenyl group comprising from 2 to 30 carbon atoms, an aryl group comprising from 6 to 30 carbon atoms or an aralkyl group comprising from 7 to 30 carbon atoms.

The term "hydrocarbon-based group comprising from 1 to 24 carbon atoms" means a linear or branched alkyl group comprising from 1 to 24 carbon atoms or a linear or branched alkenyl group comprising from 2 to 24 carbon atoms, an aryl group comprising from 6 to 24 carbon atoms, or an aralkyl group comprising from 7 to 24 carbon atoms. Preferably, J comprises from 4 to 18 carbon atoms and preferably between 6 and 12 carbon atoms.

The term "C$_2$-C$_{24}$ hydrocarbon-based chain" means a linear or branched alkyl or alkenyl group comprising from 2 to 24 carbon atoms. Preferably, the hydrocarbon-based chain is a linear alkyl group. Preferably, the hydrocarbon-based chain comprises from 6 to 16 carbon atoms.

In one embodiment of the invention, compound A2 is a compound of general formula (III) above in which:
w$_1$ and w$_2$, which may be identical or different, are integers equal to 0 or 1;
R$_4$ and R$_5$ are identical and are hydrogen atoms;
R$_5$ and R$_7$ are identical and are a hydrocarbon-based group, preferably a linear alkyl, containing from 1 to 24 carbon atoms, preferably from 4 to 18 carbon atoms, preferably from 6 to 16 carbon atoms;
L is a divalent bonding group and is a C$_6$-C$_{18}$ aryl, preferably phenyl.

The boronic diester compound A2 of formula (III) as described above is obtained via a condensation reaction between a boronic acid of general formula (III-a) and diol functions of the compounds of general formulae (III-b) and (III-c) according to reaction scheme 4 below:

23

Scheme 4

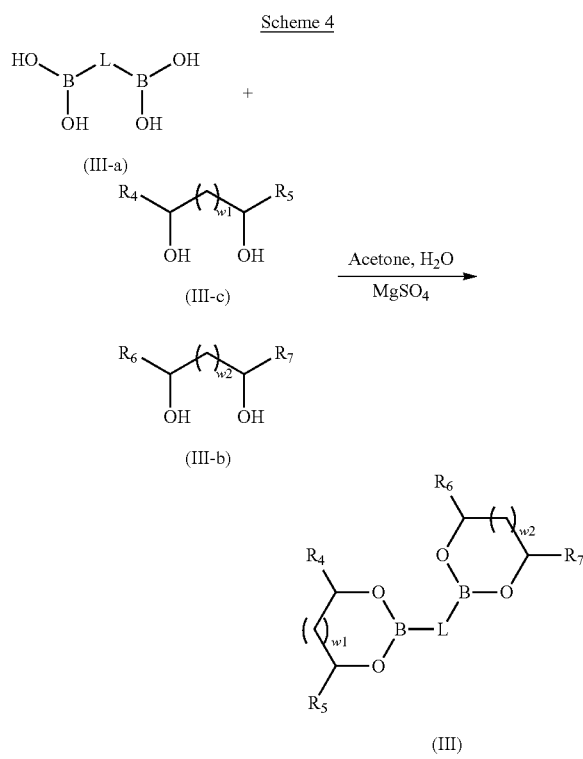

with $w_1$, $w_2$, L, $R_4$, $R_5$, R and $R_7$ as defined above.

Specifically, by condensation of the boronic acid functions of compound (III-a) with diol functions of the compounds of formula (III-b) and of formula (III-c), compounds bearing two boronic ester functions (compound of formula (III)) are obtained. This step is performed according to means that are well known to those skilled in the art.

In the context of the present invention, the compound of general formula (III-a) is dissolved, in the presence of water, in a polar solvent such as acetone. The presence of water makes it possible to shift the chemical equilibria between the boronic acid molecules of formula (III-a) and the boroxine molecules obtained from the boronic acids of formula (III-a). Specifically, it is well known that boronic acids can spontaneously form boroxine molecules at room temperature. However, the presence of boroxine molecules is not desirable in the context of the present invention.

The condensation reaction is performed in the presence of a dehydrating agent such as magnesium sulfate. This agent traps the water molecules initially introduced and also those that are released by the condensation between the compound of formula (III-a) and the compound of formula (III-b) and between the compound of formula (III-a) and the compound of formula (III-c).

In one embodiment, compound (III-b) and compound (III-c) are identical.

A person skilled in the art knows how to adapt the amounts of reagents of formulae (III-b) and/or (III-c) and of formula (III-a) to obtain the product of formula (III).

Poly(Boronic Ester) Random Copolymer Compound A2

In another embodiment, compound A2 comprising at least two boronic ester functions is a poly(boronic ester) random copolymer resulting from the copolymerization of at least one monomer M4 of formula (IV) as described below with at least one monomer M5 of formula (V) as described below.

24

In the rest of the patent application, the expressions "boronic ester random copolymer" or "poly(boronic ester) random copolymer" are equivalent and denote the same copolymer.

Monomer M4 of Formula (IV)

The monomer M4 of the boronic ester random copolymer compound A2 has the general formula (IV) in which:

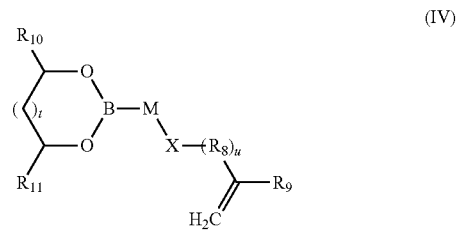

(IV)

in which:

t is an integer equal to 0 or 1;
u is an integer equal to 0 or 1;
M and $R_8$ are identical or different divalent bonding groups and are chosen from the group formed by a $C_6$-$C_{18}$ aryl, a $C_7$-$C_{24}$ aralkyl and a $C_2$-$C_{24}$ alkyl, preferably a $C_6$-$C_{18}$ aryl,
X is a function chosen from the group formed by —O—C(O)—, —C(O)—O—, —C(O)—N(H)—, —N(H)—C(O)—, —S—, —N(H)—, —N(R'$_4$)— and —O— with R'$_4$ being a hydrocarbon-based chain comprising from 1 to 15 carbon atoms;
$R_9$ is chosen from the group formed by —H, —CH$_3$ and —CH$_2$CH$_3$; preferably —H and —CH$_3$;
$R_{10}$ and $R_{11}$, which may be identical or different, are chosen from the group formed by hydrogen and a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from a hydroxyl and a group —OJ or —C(O)—O-J with J being a hydrocarbon-based group comprising from 1 to 24 carbon atoms.

The term "$C_1$-$C_{24}$ alkyl" means a linear or branched, saturated hydrocarbon-based chain comprising from 1 to 24 carbon atoms. Preferably, the hydrocarbon-based chain is linear. Preferably, the hydrocarbon-based chain comprises from 6 to 16 carbon atoms.

The term "hydrocarbon-based chain comprising from 1 to 15 carbon atoms" means a linear or branched alkyl or alkenyl group comprising from 1 to 15 carbon atoms. Preferably, the hydrocarbon-based chain is a linear alkyl group. Preferably, it comprises from 1 to 8 carbon atoms.

The term "hydrocarbon-based group comprising from 1 to 30 carbon atoms" means a linear, branched or cyclic alkyl group comprising from 1 to 30 carbon atoms, a linear, branched or cyclic alkenyl group comprising from 2 to 30 carbon atoms, an aryl group comprising from 6 to 30 carbon atoms or an aralkyl group comprising from 7 to 30 carbon atoms.

The term "hydrocarbon-based group comprising from 1 to 24 carbon atoms" means a linear or branched alkyl group comprising from 1 to 24 carbon atoms or a linear or branched alkenyl group comprising from 2 to 24 carbon atoms, an aryl group comprising from 6 to 24 carbon atoms, or an aralkyl group comprising from 7 to 24 carbon atoms.

Preferably, J comprises from 4 to 18 carbon atoms and preferably between 6 and 12 carbon atoms.

In one embodiment, the monomer M4 has the general formula (IV) in which:
- t is an integer equal to 0 or 1;
- u is an integer equal to 0 or 1;
- M and Re are divalent bonding groups and are different, M is a $C_6$-$C_{18}$ aryl, preferably phenyl, $R_8$ is a $C_7$-$C_{24}$ aralkyl, preferably benzyl;
- X is a function chosen from the group formed by —O—C(O)—, —C(O)—O—, —C(O)—N(H)— and —O—, preferably —C(O)—O— or —O—C(O)—;
- $R_9$ is chosen from the group formed by —H and —$CH_3$, preferably —H;
- $R_{10}$ and $R_{11}$ are different, one of the groups $R_{10}$ or $R_{11}$ is H and the other group
- $R_{10}$ or $R_{11}$ is a hydrocarbon-based chain, preferably a linear alkyl group containing from 1 to 24 carbon atoms, preferably between 4 and 18 carbon atoms, preferably between 6 and 12 carbon atoms.

In one embodiment, the monomer M4 is a styrene monomer. This is the case when, in formula (IV): u=1, $R_8$ is H and Re represents a $C_6$-$C_{18}$ aryl or a $C_7$-$C_{24}$ aralkyl and the double bond of the monomer M4 of formula (IV) is directly connected to the aryl group.

Synthesis of the Monomer M4 of Formula (IV)

In all the schemes presented below, unless otherwise indicated, the variables $R_{10}$, $R_{11}$, M, u, t, X, $R_8$, $R'_4$ and $R_9$ have the same definition as in formula (IV) above.

The monomers M4 of formula (IV) are especially obtained via a preparation process comprising at least one step of condensation of a boronic acid of general formula (IV-f) with a diol compound of general formula (IV-g) according to reaction scheme 5 below:

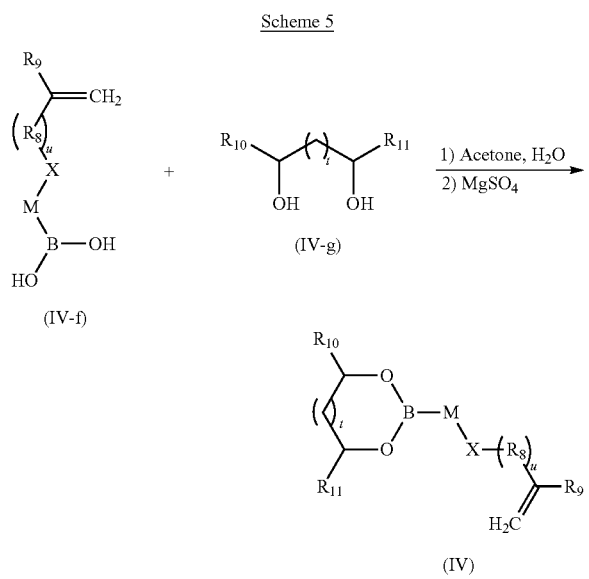

Specifically, by condensation of the boronic acid functions of the compound of formula (IV-f) with diol functions of the compounds of formula (IV-g) a boronic ester compound of formula (IV) is obtained. This step is performed according to methods that are well known to those skilled in the art.

In the context of the present invention, the compound of general formula (IV-f) is dissolved, in the presence of water, in a polar solvent such as acetone. The condensation reaction is performed in the presence of a dehydrating agent such as magnesium sulfate.

The compounds of formula (IV-g) are commercially available from the following suppliers: Sigma-Aldrich®, Alfa Aesar® and TCI®.

The compound of formula (IV-f) is obtained directly from the compound of formula (IV-e) by hydrolysis according to reaction scheme 6 below:

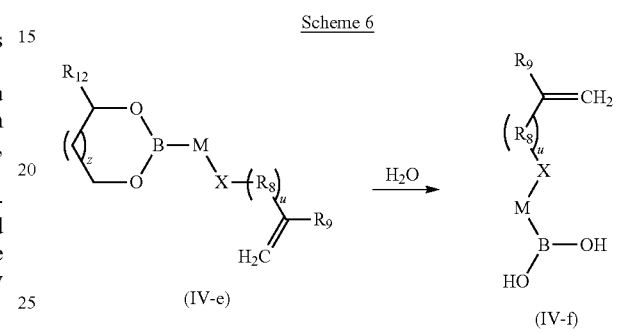

with
- z is an integer equal to 0 or 1;
- $R_{12}$ is chosen from the group formed by —H, —$CH_3$ and —$CH_2$—$CH_3$;
- u, X, M, $R_8$ and $R_9$ are as defined above.

The compound of formula (IV-e) is obtained by reaction of a compound of formula (IV-c) with a compound of formula (IV-d) according to reaction scheme 7 below:

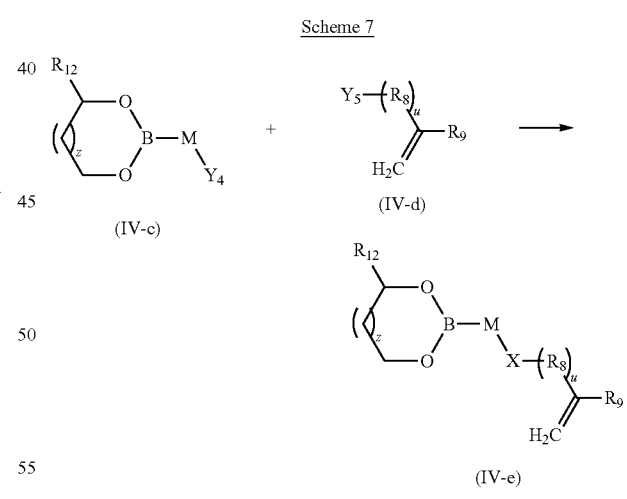

z, u, $R_{12}$, M, $R'_4$, $R_9$ and $R_8$ are as defined above; and, in this scheme, when
- X represents —O—C(O)—, then $Y_4$ represents an alcohol function —OH or a halogen atom, preferably chlorine or bromine, and $Y_5$ is a carboxylic acid function —C(O)—OH;
- X represents —C(O)—O—, then $Y_4$ represents a carboxylic acid function —C(O)—OH and $Y_5$ is an alcohol function —OH or a halogen atom, and preferably chlorine or bromine;

X represents —C(O)—N(H)—, then $Y_4$ represents a carboxylic acid function —C(O)—OH or a function —C(O)-Hal, and $Y_5$ is an amine function $NH_2$;

X represents —N(H)—C(O)—, then $Y_4$ represents an amine function $NH_2$ and $Y_5$ is a carboxylic acid function —C(O)—OH or a function —C(O)-Hal;

X represents —S—, then $Y_4$ is a halogen atom and $Y_5$ is a thiol function —SH or $Y_4$ is a thiol function —SH and $Y_5$ is a halogen atom;

X represents —N(H)—, then $Y_4$ is a halogen atom and $Y_5$ is an amine function —$NH_2$ or $Y_4$ is an amine function —$NH_2$ and $Y_5$ is a halogen atom;

X represents —N(R'$_4$)—, then $Y_4$ is a halogen atom and $Y_5$ is an amine function —N(H)(R'$_4$) or $Y_4$ is an amine function —N(H)(R'$_4$) and $Y_5$ is a halogen atom;

X represents —O—, then $Y_4$ is a halogen atom and $Y_5$ is an alcohol function —OH or $Y_4$ is an alcohol function —OH and $Y_5$ is a halogen atom.

These esterification, etherification, thioetherification, alkylation or condensation reactions between an amine function and a carboxylic acid function are well known to those skilled in the art. A person skilled in the art thus knows how to choose, as a function of the chemical nature of the groups $Y_1$ and $Y_2$, the reaction conditions to obtain the compound of formula (IV-e).

The compounds of formula (IV-d) are commercially available from the suppliers: Sigma-Aldrich®, TCI® and Acros Organics®.

The compound of formula (IV-c) is obtained via a condensation reaction between a boronic acid of formula (IV-a) with at least one diol compound of formula (IV-b) according to reaction scheme 8 below:

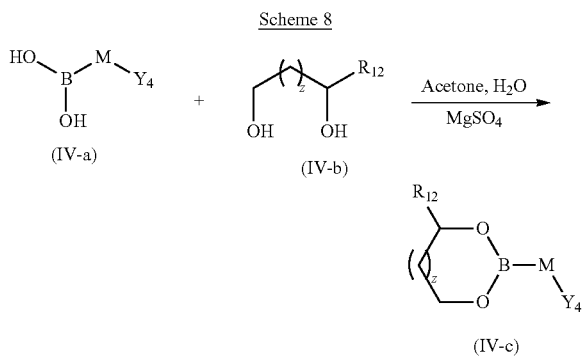

with M, $Y_4$, z and $R_{12}$ as defined above.

Among the compounds of formula (IV-b), preference is given to the one in which $R_{12}$ is methyl and z=0.

The compounds of formulae (IV-a) and (IV-b) are commercially available from the following suppliers: Sigma-Aldrich), Alfa Aesar® and TCI®.

Monomer M5 of Formula (V):

The monomer M5 of the boronic ester random copolymer compound A2 has the general formula (V)

in which:

$R_{12}$ is chosen from the group formed by —H, —$CH_3$ and —$CH_2$—$CH_3$, preferably —H and —$CH_3$;

$R_{13}$ is chosen from the group formed by a $C_6$-$C_{18}$ aryl, a $C_6$-$C_{18}$ aryl substituted with a group R'$_{13}$, —C(O)—O—R'$_{13}$; —O—R'$_{13}$, —S—R'$_{13}$ and —C(O)—N(H)—R'$_{13}$ with R'$_{13}$ being a $C_1$-$C_{25}$ alkyl group.

The term "$C_1$-$C_{25}$ alkyl group" means a linear or branched, saturated hydrocarbon-based chain containing from 1 to 25 carbon atoms. Preferably, the hydrocarbon-based chain is linear.

The term "$C_6$-$C_{18}$ aryl substituted with a group $R_{13}$" means an aromatic hydrocarbon-based compound comprising from 6 to 18 carbon atoms, at least one carbon atom of the aromatic ring of which is substituted with a $C_1$-$C_2$ alkyl group as defined above.

Among the monomers of formula (V), the monomers corresponding to formula (V-A) are among the preferred:

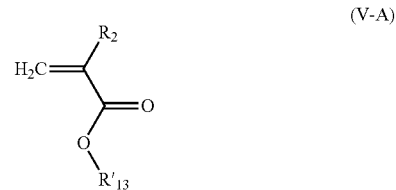

in which:

$R_2$ is chosen from the group formed by —H, —$CH_3$ and —$CH_2$—$CH_3$, preferably —H and —$CH_3$;

R'$_{13}$ is a $C_1$-$C_{25}$ alkyl group, preferably a linear $C_1$-$C_{25}$ alkyl, even more preferably a linear $C_5$-$C_{15}$ alkyl.

According to one embodiment, the monomer M5 is a styrene monomer. This is the case when, in formula (V): $R_{12}$ represents H and $R_{13}$ is chosen from the group formed by a $C_6$-$C_{18}$ aryl and a $C_6$-$C_{18}$ aryl substituted with a group R'$_{13}$ with R'$_{13}$ being a $C_1$-$C_{25}$ alkyl group and the double bond of the monomer M5 of formula (V) is directly connected to the aryl group.

Advantageously, according to this embodiment, the monomer M5 is styrene.

Production of the Monomer M5:

The monomers of formulae (V) and (V-A) are well known to those skilled in the art. They are sold by Sigma-Aidrich® and TCI®.

Styrene Monomer:

Advantageously, the copolymer A2 comprises at least one monomer of styrene nature, i.e. either styrene, or a styrene derivative, such as a styrene substituted with another group on the aromatic ring.

The monomer M4 may be a styrene monomer when, in formula (IV): u=1, $R_9$ is H and $R_8$ represents a $C_6$-$C_{18}$ aryl or a $C_7$-$C_{24}$ aralkyl and the double bond of the monomer M4 of formula (IV) is directly connected to the aryl group.

The monomer M5 may also be a styrene monomer when, in formula (V): $R_{12}$ represents H and $R_{13}$ is chosen from the group formed by a $C_6$-$C_{18}$ aryl and a $C_6$-$C_{18}$ aryl substituted with a group R'$_{13}$ with R'$_{13}$ being a $C_1$-$C_{25}$ alkyl group and the double bond of the monomer M5 of formula (V) is directly connected to the aryl group.

When neither M4 nor M5 is of styrene nature, advantageously, the copolymer A2 comprises at least one third monomer M3 of formula (X)

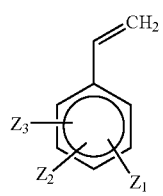

(X)

in which:
Z$_1$, Z$_2$ and Z$_3$, which may be identical or different, represent groups chosen from a hydrogen atom, a C$_1$-C$_{12}$ alkyl, and a group —OZ' or —C(O)—O—Z' with Z' being a C$_1$-C$_{12}$ alkyl.

M3 has been described in detail above for the preparation of the copolymer A1.

The preferred monomers M3 and the preferred amounts thereof are the same in A2 as in A1.

Advantageously, when A2 comprises a third monomer M3 of formula (X), this monomer M3 is styrene.

Synthesis of the Poly(Boronic Ester) Random Copolymer Compound A2

A person skilled in the art is capable of synthesizing the boronic ester random copolymers on the basis of his or her general knowledge. The copolymerization may be initiated in bulk or in solution in an organic solvent with free-radical-generating compounds. For example, the boronic ester random copolymers are obtained via the known processes of radical copolymerization, especially controlled radical copolymerization, such as the method known as reversible addition-fragmentation chain transfer (RAFT) controlled radical polymerization and the method known as atom-transfer radical polymerization (ATRP). Conventional radical polymerization and telomerization may also be employed to prepare the polymers of the invention (Moad, G.; Solomon, D. H., The Chemistry of Radical Polymerization. 2nd ed.; Elsevier Ltd: 2006; page 639; Matyaszewski, K.; Davis, T. P. Handbook of Radical Polymerization; Wiley-Interscience: Hoboken, 2002; page 936).

The boronic ester random copolymer is prepared according to a process which comprises at least one polymerization step (a) in which are placed in contact at least:
i) one first monomer M4 of general formula (IV) as defined previously;
ii) at least one second monomer M5 of general formula (V) as defined previously;
iii) at least one source of free radicals.

In one embodiment, the process may also comprise iv) at least one chain-transfer agent.

The preferences and definitions described for the general formulae (IV) and (V) also apply to the process.

The sources of radicals and the transfer agents are those that have been described for the synthesis of polydiol random copolymers. The preferences described the sources of radicals and the transfer agents also apply to this process.

Properties of the Poly(Boronic Ester) Random Copolymer Compounds A2 advantageously, the chain formed by the sequence of groups R$_{10}$, M, (R$_8$)$_u$ with u being an integer equal to 0 or 1, and X of the monomer M4 of general formula (IV) has a total number of carbon atoms ranging from 8 to 38 and preferably ranging from 10 to 26.

Advantageously, the side chains of the boronic ester random copolymer have a mean length of greater than 8 carbon atoms, preferably ranging from 11 to 16. This chain length makes it possible to dissolve the boronic ester random copolymer in the hydrophobic medium. The term "mean length of the side chain" means the mean length of the side chains of each monomer constituting the copolymer. The side chains derived from the styrene monomer(s) are not taken into account in the calculation of the mean lengths of the side chains. A person skilled in the art knows how to obtain this mean length by appropriately selecting the types and ratio of monomers constituting the boronic ester random copolymer.

Advantageously, the boronic ester random copolymer A2 has a molar percentage of monomer of formula (IV) in said copolymer ranging from 0.25% to 30%, preferably from 1% to 25% and better still from 5% to 20%.

Advantageously, the boronic ester random copolymer A2 has a molar percentage of monomer of formula (IV) in said copolymer ranging from 0.25% to 30%, preferably from 1% to 25%, and a molar percentage of monomer of formula (V) in said copolymer ranging from 70% to 99.75%, preferably from 75% to 99%.

Advantageously, the boronic ester random copolymer A2 has a molar percentage of styrene monomer(s), of formulae (IV), (V) and/or (X), in said copolymer ranging from 2 mol % to 50 mol %, preferentially from 3 mol % to 40 mol % and more preferably from 5 mol % to 35 mol %.

The term "molar percentage of styrene monomer(s)" means the sum of the contents of each of the styrene monomers in the boronic ester random copolymer A2, and the styrene monomers may be:
of formula (IV) when, in formula (IV): u=1, R$_9$ is H and R$_8$ represents a C$_6$-C$_{18}$ aryl or a C$_7$-C$_{24}$ aralkyl and the double bond of the monomer M4 of formula (IV) is directly connected to the aryl;
of formula (V) when, in formula (V): R$_{12}$ represents H and R$_{13}$ is chosen from the group formed by a C$_6$-C$_{18}$ aryl and a C$_6$-C$_{18}$ aryl substituted with a group R'$_{13}$ with R'$_{13}$ being a C$_1$-C$_{25}$ alkyl group and the double bond of the monomer M5 of formula (V) is directly connected to the aryl group,
and/or
of formula (X), as explained above.

Advantageously, the boronic ester random copolymer has a number-average degree of polymerization ranging from 50 to 1500 and preferably from 50 to 800.

Advantageously, the boronic ester random copolymer has a polydispersity index (Ip) ranging from 1.04 to 3.54, preferably ranging from 1.10 to 3.10. These values are obtained by size exclusion chromatography using tetrahydrofuran as eluent and poly(methyl methacrylate) calibration.

Advantageously, the boronic ester random copolymer has a number-average molar mass ranging from 10 000 to 200 000 g/mol, preferably from 25 000 to 100 000 g/mol. These values are obtained by size exclusion chromatography using tetrahydrofuran as eluent and poly(methyl methacrylate) calibration.

Compound A2, especially the boronic ester random copolymer, has the property of being able to react in a hydrophobic medium, especially an apolar medium, with a compound bearing diol function(s) via a transesterification reaction. This transesterification reaction may be represented according to scheme 9 below:

Scheme 9

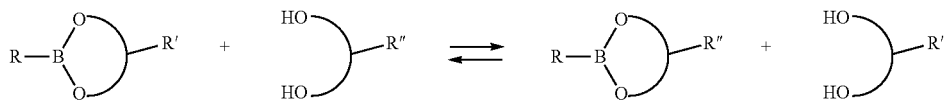

Thus, during a transesterification reaction, a boronic ester of different chemical structure from that of the starting boronic ester is formed by exchange of the hydrocarbon-based groups symbolized by

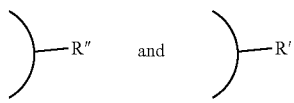

Exogenous Compound A4

According to one embodiment, the additive composition results from the mixing of at least:
one polydiol random copolymer A1,
one random copolymer A2 comprising at least two boronic ester functions and which can associate with said polydiol random copolymer A1 via at least one transesterification reaction,
one exogenous compound A4 chosen from 1,2-diols and 1,3-diols.

Advantageously, according to this embodiment of the invention, the molar percentage of exogenous compound A4 in the additive composition, relative to the boronic ester functions of the random copolymer A2 ranges from 0.025% to 5000%, preferably from 0.1% to 1000%, even more preferably from 0.5% to 500% and even more preferably from 1% to 150,%.

The exogenous compound A4 is chosen from 1,2-diols and 1,3-diols. For the purposes of the present invention, the term "exogenous compound" means a compound which is added to the additive composition resulting from the mixing of at least one polydiol random copolymer A1 and of at least one compound A2, especially the poly(boronic ester) random copolymer, The exogenous compound A4 may have the general formula (VI):

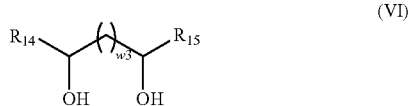

(VI)

in which:
w3 is an integer equal to 0 or 1,
$R_{14}$ and $R_{15}$, which may be identical or different, are chosen from the group formed by hydrogen and a hydrocarbon-based group containing from 1 to 24 carbon atoms, preferably between 4 and 18 carbon atoms, preferably between 6 and 12 carbon atoms.

The term "hydrocarbon-based chain comprising from 1 to 24 carbon atoms" means a linear or branched alkyl or alkenyl group comprising from 1 to 24 carbon atoms. Preferably, the hydrocarbon-based chain is a linear alkyl group. Preferably, it comprises from 4 to 18 carbon atoms and preferably between 6 and 12 carbon atoms.

In one embodiment, the exogenous compound A4 has the general formula (VI) in which:
$w_3$ is an integer equal to 0 or 1;
$R_{14}$ and $R_{15}$ are different, one of the groups $R_{14}$ or $R_{15}$ is H and the other group $R_{14}$ or $R_{15}$ is a hydrocarbon-based chain, preferably a linear alkyl group containing from 1 to 24 carbon atoms, preferably between 4 and 18 carbon atoms, preferably between 6 and 12 carbon atoms.

In one embodiment, the exogenous compound A4 has a chemical structure different from that of the diol compound A3 released in situ via the transesterification reaction. In this embodiment, at least one of the substituents $R_{14}$, $R_{15}$ or the value of the index $w_3$ of the exogenous compound A4 of formula (VI) is different, respectively, from the substituents $R_4$ and $R_5$ or from the value of the index w, or from the substituents $R_5$ and $R_7$ or from the value of the index $w_2$ of the boronic diester compound A2 of formula (III) or is different, respectively, from the substituents $R_{10}$, $R_{11}$ or from the value of the index t of the monomer (IV) of the poly(boronic ester) random copolymer A2.

In another embodiment, the exogenous compound A4 has a chemical structure identical to that of the diol compound A3 released in situ via the transesterification reaction. In this embodiment, the substituents $R_{14}$, $R_{15}$ and the value of the index $w_3$ of the exogenous compound A4 of formula (VI) is identical, respectively, to the substituents $R_4$ and $R_5$ and to the value of the index w, or to $R_5$ and $R_7$ and to the value of the index $w_2$ of the boronic diester compound A2 of formula (III) or is identical, respectively, to the substituents $R_{10}$, $R_{11}$ and to the value of the index t of the monomer (IV) of the poly(boronic ester) random copolymer A2. According to its temperature of use, the additive composition resulting from the mixing of at least one polydiol random copolymer A1, of at least one compound A2, especially a random copolymer A2, comprising at least two boronic ester functions and which can associate with said polydiol random copolymer A1 via a transesterification reaction, and of an addition of at least one exogenous compound A4 as defined above, may also comprise a diol compound A3 released in situ, which is identical to the exogenous compound A4 added to the composition.

For the purposes of the present invention, the term "diol released in situ" means the compound bearing a diol function, this compound being produced in the additive composition during the exchange of the hydrocarbon-based groups of the boronic ester compound A2, especially of the poly(boronic ester) random copolymer, during the transesterification reaction. The polydiol random polymer A1 is not a diol released in situ within the meaning of the present invention.

The compounds of formula (VI) are commercially available from the following suppliers: Sigma-Aldrich®, Alfa Aesar® and TCI®.

Characteristics of the Novel Additive Compositions of the Invention

The additive compositions of the invention resulting from the mixing of at least one polydiol random copolymer A1 as defined above, of at least one compound A2 as defined previously, especially of at least one poly(boronic ester) random copolymer as defined above, and optionally of at least one exogenous compound A4 as defined above have rheological properties that are very varied as a function of the temperature and according to the proportion of the compounds A1, A2 and optionally A4 used.

The polydiol random copolymers A1 and the compounds A2 as defined above have the advantage of being associative and of exchanging chemical bonds thermoreversibly, especially in a hydrophobic medium, especially in an apolar hydrophobic medium.

Under certain conditions, the polydiol random copolymers A1 and the compounds A2 as defined above may be crosslinked.

The polydiol random copolymers A1 and the compounds A2 also have the advantage of being exchangeable.

The term "associative" means that covalent chemical bonds of boronic ester type are established between the polydiol random copolymers A1 and the compounds A2 comprising at least two boronic ester functions, especially with the poly(boronic ester) random copolymer. Depending on the functionality of the polydiols A1 and of the compounds A2 and depending on the composition of the mixtures, the formation of covalent bonds between the polydiols A1 and the compounds A2 will optionally be able to lead to the formation of a three-dimensional polymer network.

The term "chemical bond" means a covalent chemical bond of boronic ester type.

The term "exchangeable" means that the compounds are capable of exchanging chemical bonds between themselves without the total number or nature of the chemical functions being modified. The chemical exchange reaction (transesterification) is illustrated in reaction scheme 10 below:

compounds A4 to form novel boronic esters and novel diol functions without the total number of boronic ester functions and of diol functions being affected. This other chemical bond exchange process takes place by metathesis reaction, via successive exchanges of the boronic ester functions in the presence of diols. Another chemical bond exchange process is illustrated in FIG. 3, in which it may be observed that the polydiol random copolymer A1-1, which was associated with the polymer A2-1, has exchanged two boronic ester bonds with the boronic ester random copolymer A2-2. The polydiol random copolymer A1-2, which was associated with the polymer A2-2, has exchanged two boronic ester bonds with the boronic ester random copolymer A2-1; the total number of boronic ester bonds in the composition remains unchanged and is equal to 4. The copolymer A1-1 is then associated with the polymer A2-2. The copolymer A1-2 is then associated with the polymer A2-1. The copolymer A2-1 has been exchanged with the polymer A2-2.

The term "crosslinked" refers to a copolymer in the form of a network obtained by establishing bridges between the macromolecular chains of the copolymer. These chains connected together are for the most part distributed in the three dimensions of space. A crosslinked copolymer forms a three-dimensional network. In practice, the formation of a copolymer network is confirmed by a solubility test. It may be confirmed that a copolymer network has been formed by placing the copolymer network in a solvent known to dissolve non-crosslinked copolymers of the same chemical nature. If the copolymer swells instead of being dissolved, a person skilled in the art knows that a network has been formed. FIG. 4 illustrates this solubility test.

The term "crosslinkable" refers to a copolymer that is capable of being crosslinked.

Scheme 10

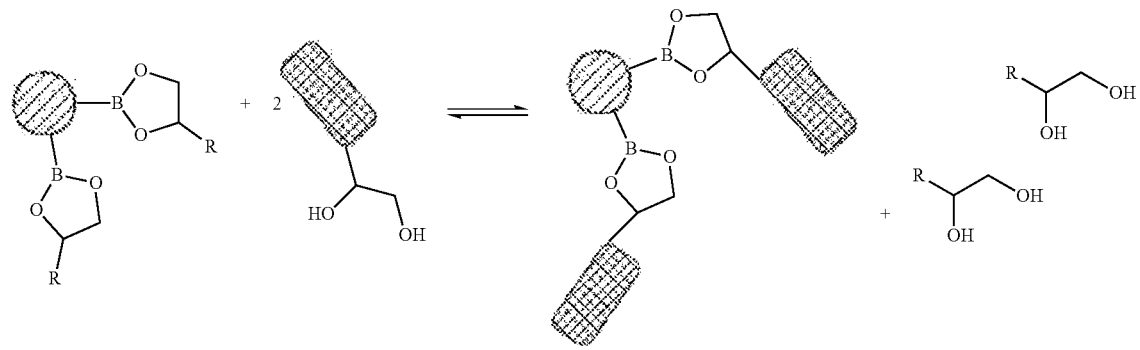

with:
R being a chemical group of the compound A2,
the hatched circle symbolizes the rest of the chemical structure of compound A2,
the cross-ruled rectangle symbolizes the rest of the chemical structure of the polydiol random copolymer A1.

The boronic ester bonds of the compounds A2, optionally the boronic ester bonds formed by transesterification reaction between the boronic esters of the compounds A2 and the exogenous compounds A4, and also the boronic ester bonds formed by association of the polydiol random copolymers A1 and of the compounds A2 can exchange with the diol functions borne by the compounds A3 released in situ and optionally with diol functions borne by the exogenous The term "reversibly crosslinked" refers to a crosslinked copolymer whose bridges are formed via a reversible chemical reaction. The reversible chemical reaction can move in one direction or in another, leading to a change of structure of the polymer network. The copolymer may go from an initial non-crosslinked state to a crosslinked state (three-dimensional copolymer network) and from a crosslinked state to a non-crosslinked initial state. In the context of the present invention, the bridges that are formed between the copolymer chains are labile. These bridges may be formed or be exchanged by means of a chemical reaction that is reversible. In the context of the present invention, the reversible chemical reaction is a transesterification reaction between diol functions of a random copolymer (copolymer A1) and boronic ester functions of a crosslinking agent (compound A2). The bridges formed are bonds of boronic ester type. These boronic ester bonds are covalent and labile due to the reversibility of the transesterification reaction.

The term "thermoreversibly crosslinked" refers to a copolymer that is crosslinked by means of a reversible reaction whose movement in one direction or in the other direction is controlled by the temperature. The mechanism of thermoreversible crosslinking of the composition of the invention is presented schematically in FIG. 5. At a low temperature, the polydiol copolymer A1 (symbolized by the copolymer bearing functions A in FIG. 5) is not or is only sparingly crosslinked with the boronic ester compounds A2 (symbolized by the compound bearing functions B in FIG. 5). When the temperature increases, the diol functions of copolymer A1 react with the boronic ester functions of compound A2 via a transesterification reaction. The diol random copolymers A1 and the compounds A2 comprising at least two boronic ester functions then bond together and can be exchanged. Depending on the functionality of the polydiols A1 and of the compounds A2 and depending on the composition of the mixtures, a gel may form in the medium, especially when the medium is apolar. When the temperature decreases again, the boronic ester bonds between the polydiol random copolymers A1 and the compounds A2 become broken and, as may be the case, the composition loses its gelled nature.

The amount of boronic ester bonds (or boronic ester bond) that can be established between the polydiol random copolymers A1 and the compounds A2 is adjusted by a person skilled in the art by means of an appropriate selection of the polydiol random copolymer A1, of compound A2 and of the composition of the mixture.

In addition, a person skilled in the art knows how to select the structure of compound A2 as a function of the structure of the random copolymer A1. Preferably, when, in the random copolymer A1 comprising at least one monomer M1 in which y=1, then compound A2 of general formula (III) or the copolymer A2 comprising at least one monomer M4 of formula (IV) will preferably be chosen with w, =1, $w_2$=1 and t=1, respectively.

By controlling the degree of association of the polydiol random copolymer A1 and of compound A2, especially of the poly(boronic ester) random copolymer, the viscosity and the rheological behavior of this composition are modified. When it is present, the exogenous compound A4 makes it possible to modify the viscosity of this composition as a function of the temperature and according to the desired use.

In a preferred embodiment of the invention, the exogenous compound A4 is of the same chemical nature as the diol compound A3 released in situ by transesterification reaction between the polydiol random copolymer A1 and compound A2, especially the poly(boronic ester) random copolymer. According to this embodiment, the total amount of free diols present in said composition is strictly greater than the amount of diol compounds released in situ. The term "free diols" means the diol functions that are able to form a chemical bond of boronic ester type by transesterification reaction. For the purposes of the present patent application, the term "total amount of free diols" means the total number of diol functions that can form a chemical bond of boronic ester type by transesterification.

According to this embodiment, the total amount of free diols is always equal to the sum of the number of moles of exogenous diol compounds A4 and of the number (expressed in mol) of diol functions of the polydiol copolymer A1. In other words, if, in the additive composition, there are:

i mol of exogenous diol compounds A4 and
j mol of polydiol random copolymers A1,
the total amount of free diol will be at any instant (thus irrespective of the degree of association between the polydiol random copolymer A1 and compound A2, especially the poly(boronic ester) random copolymer A2)=i+j* the mean number of diols per random polymer chain A1 (unit: mol).

The amount of diols released in situ in the context of the transesterification reactions between A1 and A2 is equal to the number of boronic ester functions connecting the copolymers A1 and A2.

A person skilled in the art knows how to select the chemical structure and the amount of exogenous compounds A4 that he adds to the additive composition as a function of the molar percentage of boronic ester function of compound A2, especially as a function of the poly(boronic ester) random copolymer, to modify the rheological behavior of the composition.

Advantageously, the content of random copolymer A1 in the composition ranges from 0.1% to 50.0% by weight relative to the total weight of the composition, preferably from 0.25% to 40% by weight relative to the total weight of the final composition, and more preferably from 1% to 30% by weight relative to the total weight of the final composition.

Advantageously, the content of compound A2 in the composition ranges from 0.1% to 50.0% by weight relative to the total weight of the composition, preferably from 0.25% to 40% by weight relative to the total weight of the final composition, and more preferably from 0.5% to 30% by weight relative to the total weight of the final composition.

In one embodiment, the content of random copolymer A1 in the composition ranges from 0.5% to 50.0% by weight relative to the total weight of the composition and the content of compound A2, especially of boronic ester random copolymer, in the composition ranges from 0.5% to 50.0% by weight relative to the total weight of the composition.

Preferentially, the mass ratio between the polydiol random compound A1 and compound A2 (ratio A1/A2) in the composition ranges from 0.005 to 200, preferably from 0.05 to 20 and even more preferably from 0.1 to 10.

In one embodiment, the molar percentage of exogenous compound A4 in the additive composition ranges from 0.025% to 5000%, preferably from 0.1% to 1000%, more preferably from 0.5% to 500% and even more preferably from 1% to 150% relative to the boronic ester functions of compound A2, especially of the poly(boronic ester) random copolymer. The molar percentage of exogenous compound A4 relative to the number of boronic ester functions of compound A2 is the ratio of the number of moles of exogenous compound A4 to the number of moles of boronic ester function of compound A2, the whole multiplied by 100. The number of moles of boronic ester function of compound A2 may be determined by a person skilled in the art by proton NMR analysis of compound A2, or by monitoring the conversion into monomers during the synthesis of the copolymer A2, when compound A2 is a poly(boronic ester) random copolymer.

In one preferred embodiment, the composition of the invention is in the form of a stock composition. The term "stock composition" means a composition from which a person skilled in the art can make daughter solutions by taking a certain amount of stock solution made up by the addition of a necessary amount of diluent (solvent or the like) to obtain a desired concentration. A daughter composition is thus obtained by dilution of a stock composition.

A hydrophobic medium may be a solvent, a mineral oil, a natural oil or a synthetic oil.

In one embodiment, the composition of the invention may also comprise at least one additive chosen from the group formed by thermoplastics, elastomers, thermoplastic elastomers, thermosetting polymers, pigments, dyes, fillers, plasticizers, fibers, antioxidants, lubricant additives, compatibilizers, antifoams, dispersants additives, adhesion promoters and stabilizers.

Process for Preparing the Novel Additive Compositions of the Invention

The novel additive compositions of the invention are prepared by means that are well known to those skilled in the art. For example, it suffices especially for a person skilled in the art:

- to take a desired amount of a solution comprising the polydiol random copolymer A1 as defined above;
- to take a desired amount of a solution comprising compound A2 as defined above; especially a desired amount of a solution comprising the poly(boronic ester) random copolymer as defined previously; and
- optionally to take a desired amount of a solution comprising the exogenous compound A4 as defined above;
- to mix the solutions taken, either simultaneously or sequentially, to obtain the composition of the invention.

The order of addition of the compounds has no influence in the implementation of the process for preparing the additive composition.

A person skilled in the art also knows how to adjust the various parameters of the composition of the invention to obtain either a composition in which the polydiol random copolymer A1 and compound A2, especially the boronic ester random copolymer, are associated or a composition in which the polydiol random copolymer A1 and compound A2, especially the boronic ester random copolymer, are crosslinked and to modify the degree of association or the degree of crosslinking thereof for a given temperature of use. For example, a person skilled in the art knows especially how to adjust:

- the molar percentage of monomer M1 bearing diol functions in the polydiol random copolymer A1,
- the content of styrene monomer M3 in the polydiol random copolymer A1;
- the molar percentage of monomer M4 bearing boronic ester functions in the boronic ester random copolymer A2,
- the mean length of the side chains of the polydiol random copolymer A1,
- the mean length of the side chains of the boronic ester random copolymer A2,
- the length of the monomer M4 of the boronic ester random copolymer A2,
- the content of styrene monomer M4 of formula (IV) or M5 of formula (V) or M3 of formula (X) in the boronic ester random copolymer A2;
- the length of the boronic diester compound A2;
- the number-average degree of polymerization of the polydiol random copolymers A1 and of the boronic ester random copolymers A2;
- the mass percentage of the polydiol random copolymer A1;
- the mass percentage of the boronic diester compound A2;
- the mass percentage of the boronic ester random copolymer A2, and, where appropriate:
- the molar amount of the exogenous compound A4 relative to the boronic ester functions of compound A2, especially of the poly(boronic ester) random copolymer,
- the chemical nature of the exogenous compound A4;
- the molar percentage of exogenous compound A4;
. . . .

Use of the Novel Compositions of the Invention

The compositions of the invention may be used in any medium whose viscosity varies as a function of the temperature. The compositions of the invention make it possible to thicken a fluid and to modify the viscosity as a function of the temperature of use. The additive composition according to the invention may be used in fields as varied as assisted oil recovery, the paper industry, paints, food additives, and cosmetic or pharmaceutical formulation.

Lubricant Composition According to the Invention

Another subject of the invention relates to a lubricant composition resulting from the mixing of at least:
- one lubricant oil,
- one polydiol random copolymer A1 as defined previously,
  - one random copolymer A2, as defined previously, comprising at least two boronic ester functions and which can associate with said polydiol random copolymer A1 via at least one transesterification reaction,
- optionally, one exogenous compound A4 chosen from 1,2-diols and 1,3-diols, and especially as defined previously.

The preferences and definitions described for the general formulae (I), (I-A), (I-B), (II-A), (II-B) and (X) also apply to the polydiol random copolymer A1 used in the lubricant compositions of the invention.

The preferences and definitions described for the general formulae (IV) and (V) also apply to the boronic ester random copolymer A2 used in the lubricant compositions of the invention.

The lubricant compositions according to the invention have inverse behavior with respect to modification of the temperature when compared with the behavior of the base oil and the rheological additives of polymer type of the prior art and have the advantage in that this rheological behavior may be modified as a function of the temperature of use. In contrast with base oil, which becomes fluidized when its temperature increases, the compositions of the present invention have the advantage of thickening when the temperature increases. The formation of the reversible covalent bonds makes it possible to increase (reversibly) the molar mass of the polymers and thus limits the drop in viscosity of the base oil at high temperatures. The additional addition of diol compounds makes it possible to control the degree of formation of these reversible bonds. Advantageously, the viscosity of the lubricant composition is thus controlled and depends less on temperature fluctuations. In addition, for a given temperature of use, it is possible to modify the viscosity of the lubricant composition and its rheological behavior by modifying the amount of diol compounds added to the lubricant composition. Finally, the lubricant compositions of the invention have improved thermal stability, improved stability to oxidation, and improved viscosity index, improved resistance to cycling and better reproducibility of the performance qualities over time.

Lubricant Oil

The term "oil" means a fatty substance that is liquid at room temperature (25° C.) and atmospheric pressure (760 mmHg i.e. $10^5$ Pa).

The term "lubricant oil" means an oil which attenuates the friction between two moving parts in order to facilitate the functioning of these parts. These lubricant oils may be of natural, mineral or synthetic origin.

The lubricant oils of natural origin may be oils of plant or animal origin, preferably oils of plant origin such as rapeseed oil, sunflower oil, palm oil, coconut kernel oil, etc.

The lubricant oils of mineral origin are of petroleum origin and are extracted from petroleum fractions originating from the atmospheric and vacuum distillation of crude oil. The distillation may be followed by refining operations such as solvent extraction, deasphalting, deparaffinning with solvent, hydrotreatment, hydrocracking, hydroisomerization, hydrofinishing, etc. By way of illustration, mention may be made of paraffinic mineral base oils such as the oil Bright Stock Solvent (BSS), naphthenic mineral base oils, aromatic mineral oils, hydrorefined mineral bases whose viscosity index is about 100, hydrocracked mineral bases whose viscosity index is between 120 and 130, or hydroisomerized mineral bases whose viscosity index is between 140 and 150.

The lubricant oils of synthetic origin (or synthetic bases) originate, as their name indicates, from chemical synthesis, such as the addition of a product to itself or polymerization, or the addition of one product to another product such as esterification, alkylation, fluorination, etc., of components originating from petrochemistry, carbon chemistry and mineral chemistry such as: olefins, aromatics, alcohols, acids, halogen-based, phosphorus-based, silicon-based compounds, etc. By way of illustration, mention may be made of:

synthetic oils based on synthetic hydrocarbons such as poly-alpha-olefins (PAO), internal polyolefins (IPO), polybutenes and polyisobutenes (PIB), -alkylbenzenes and alkylated polyphenyls;

synthetic oils based on esters such as diacid esters or neopolyol esters;

synthetic oils based on polyglycols, such as monoalkylene glycols, polyalkylene glycols and polyalkylene glycol mono ethers;

synthetic oils based on phosphate esters;

synthetic oils based on silicon derivatives such as silicone oils or polysiloxanes.

The lubricant oils that may be used in the composition of the invention may be chosen from any oil from groups I to V specified in the API guidelines (Base Oil Interchangeability Guidelines of the American Petroleum Institute (API)) (or equivalents thereof according to the ATIEL classification (Association Technique de l'Industrie Europoéenne des Lubrifiants) as summarized below:

| | Content of saturated compounds* | Sulfur content** | Viscosity index (VI)*** |
|---|---|---|---|
| Group I Mineral oils | <90% | >0.03% | 80 ≤ VI > 120 |
| Group II Hydrocracked oils | ≥90% | ≤0.03% | 80 ≤ VI > 120 |
| Group III Hydrocracked or hydroisomerized oils | ≥90% | ≤0.03% | ≥120 |
| Group IV | (PAO) poly-alpha-olefins | | |
| Group V | Esters and other bases not included in the bases of groups I to IV | | |

*measured according to the standard ASTM D2007
**measured according to the standards ASTM D2622, ASTM D4294, ASTM D4927 and ASTM D3120
***measured according to the standard ASTM D2270

The compositions of the invention may comprise one or more lubricant oils. The lubricant oil or the lubricant oil mixture is the predominant ingredient in the lubricant composition. It is then referred to as the lubricant base oil. The term "predominant ingredient" means that the lubricant oil or the lubricant oil mixture represents at least 51% by weight relative to the total weight of the composition.

Preferably, the lubricant oil or the lubricant oil mixture represents at least 70% by weight relative to the total weight of the composition.

In one embodiment of the invention, the lubricant oil is chosen from the group formed by the oils of group I, of group II, of group III, of group IV and of group V of the API classification, and a mixture thereof. Preferably, the lubricant oil is chosen from the group formed by the oils of group III, of group IV and of group V of the API classification, and a mixture thereof. Preferably, the lubricant oil is an oil from group III of the API classification.

The lubricant oil as a kinematic viscosity at 100° C. measured according to the standard ASTM D445 ranging from 2 to 150 cSt and preferably ranging from 2 to 15 cSt.

Functional Additives

According to one embodiment, the composition of the invention may also comprise one or more functional additive chosen from the group formed by detergents, anti-wear additives, extreme-pressure additives, antioxidants, viscosity-index-enhancing polymers, flow-point improvers, antifoams, thickeners, anticorrosion additives, dispersants, friction modifiers, and mixtures thereof.

The functional additive(s) which are added to the composition of the invention are chosen as a function of the final use of the lubricant composition. These additives may be introduced in two different ways:

either each additive is added individually and sequentially to the composition, or all of the additives are added simultaneously to the composition; the additives are, in this case, generally available in the form of a pack, known as an additive pack.

The functional additive or the mixture of functional additives, when they are present, represent from 0.1% to 10% by weight relative to the total weight of the composition.

Detergents:

These additives reduce the formation of deposits on the surface of metal parts by dissolving the oxidation and combustion byproducts. The detergents that may be used in the lubricant compositions according to the present invention are well known to those skilled in the art. The detergents commonly used in the formulation of lubricant compositions are typically anionic compounds including a long lipophilic hydrocarbon-based chain and a hydrophilic head. The associated cation is typically a metal cation of an alkali metal or an alkaline-earth metal. The detergents are preferentially chosen from the alkali metal or alkaline-earth metal salts of carboxylic acids, sulfonates, salicylates and naphthenates, and also phenate salts. The alkali metals and alkaline-earth metals are preferentially calcium, magnesium, sodium or barium. These metal salts may contain the metal in an approximately stoichiometric amount or in excess (in an amount greater than the stoichiometric amount). In the latter case, these detergents are known as overbased detergents. The excess metal giving the overbased nature to the detergent is in the form of oil-insoluble metal salts, for example carbonate, hydroxide, oxalate, acetate or glutamate, preferentially carbonate.

Anti-wear additives and extreme-pressure additives:

These additives protect the friction surfaces by forming a protective film adsorbed onto these surfaces. A wide variety of anti-wear and extreme-pressure additives exists. Illustrations that may be mentioned include phosphosulfur additives such as metal alkyithiophosphates, in particular zinc alkylthiophosphates and more specifically zinc dialkyldithiophosphates or ZnDTP, amine phosphates, polysulfides, especially sulfur-based olefins and metal dithiocarbamates.

Antioxidants:

These additives retard the degradation of the composition. Degradation of the composition may be reflected by the formation of deposits, the presence of sludges, or an increase in the viscosity of the composition. Antioxidants act as radical inhibitors or peroxide destroyers. Among the antioxidants commonly employed are antioxidants of phenolic or amine type.

Anticorrosion Agents:

These additives cover the surface with a film which prevents the access of oxygen to the surface of the metal. They may occasionally neutralize acids or certain chemical products to prevent corrosion of the metal. By way of illustration, examples that may be mentioned include dimercaptothiadlazole (DMTD), benzotriazoles and phosphites (uptake of free sulfur).

Viscosity-Index-Enhancing Polymers:

These additives ensure good cold resistance and a minimum viscosity at high temperature for the composition. By way of illustration, examples that may be mentioned include polymer esters, olefin copolymers (OCP) or polymethacrylates (PMA).

Flow-Point Improvers:

These additives improve the cold behavior of compositions, by slowing the formation of paraffin crystals. They are, for example, polyalkyl methacrylates, polyacrylates, polyacrylamides, polyalkylphenols, polyalkylnaphthalenes and polyalkylstyrenes.

Antifoams:

These additives have the effect of countering the effect of the detergents. Illustrations that may be mentioned include polymethylsiloxanes and polyacrylates.

Thickeners:

Thickeners are additives used above all for industrial lubrication and make it possible to formulate lubricants of higher viscosity than engine lubricant compositions. Illustrations that may be mentioned include polyisobutenes with a weight-average molar mass of from 10 000 to 100 000 g/mol.

Dispersants:

These additives ensure the holding in suspension and the removal of insoluble solid contaminants constituted by the oxidation byproducts that are formed during the use of the composition. By way of illustration, examples that may be mentioned include succinimides, PIB (polyisobutene) succinimides and Mannich bases.

Friction Modifiers:

These additives improve the coefficient of friction of the composition. Illustrations that may be mentioned include molybdenum dithiocarbamate, a means bearing at least one hydrocarbon-based chain of at least 16 carbon atoms, and fatty acid esters of polyols such as fatty acid esters of glycerol, in particular glyceryl monooleate.

Process for Preparing the Lubricant Compositions of the Invention

The lubricant compositions of the invention are prepared by means that are well known to those skilled in the art. For example, it suffices especially for a person skilled in the art:
to take a desired amount of a solution comprising the diol random copolymer A1 as defined above, especially that resulting from the copolymerization of at least one monomer of formula (I) with at least one monomer of formula (II-A) and at least one monomer of formula (II-B);
to take a desired amount of a solution comprising the poly(boronic ester) random copolymer A2 as defined previously;
optionally to take a desired amount of a solution comprising the exogenous compound A4 as defined above;
to mix, either simultaneously or sequentially, the solution is taken in a lubricant base oil, to obtain the lubricant composition of the invention.

The order of addition of the compounds has no influence in the implementation of the process for preparing the lubricant composition.

Properties of the Lubricant Compositions According to the Invention

The lubricant compositions of the invention result from the mixing of associative polymers which have the property of increasing the viscosity of the lubricant oil via associations. The lubricant compositions according to the invention have the advantage in that these associations, or crosslinking, are thermoreversible and optionally in that the degree of association or of crosslinking may be controlled by means of the addition of an additional diol compound. In addition, they have improved thermal stability, and improved viscosity index, improved stability to oxidation, better cycling performance, and better reproducibility of the performance qualities over time.

A person skilled in the art knows how to adjust the various parameters of the various constituents of the composition to obtain a lubricant composition whose viscosity increases when the temperature increases and to modify the viscosity and the rheological behavior thereof.

The amount of boronic ester bonds (or boronic ester bond) that can be established between the polydiol random copolymers A1 and the compounds A2, especially the boronic ester random copolymer A2, is adjusted by a person skilled in the art by means of an appropriate selection of the polydiol random copolymer A1, of compound A2, especially the boronic ester random copolymer A2, optionally of the exogenous compound A4, and especially of the molar percentage of exogenous compound A4.

In addition, a person skilled in the art knows how to select the structure of compound A2, especially of the boronic ester random copolymer, as a function of the structure of the random copolymer A1. Preferably, when, in the random copolymer A1 comprising at least one monomer M1 in which y=1, then compound A2 of general formula (III) or the copolymer A2 comprising at least one monomer M4 of formula (IV) will preferably be chosen with $w_1=1$, $w_2=1$ and t=1, respectively.

Moreover, a person skilled in the art knows especially how to adjust:
the molar percentage of monomer M1 bearing diol functions in the polydiol random copolymer A1,
the molar percentage of monomer M3 of formula (X) in the polydiol random copolymer A1, especially the molar percentage of styrene,
the molar percentage of monomer M4 bearing boronic ester functions in the boronic ester random copolymer A2,
the mean length of the side chains of the polydiol random copolymer A1,
the mean length of the side chains of the boronic ester random copolymer A2,
the length of the monomer M4 of the boronic ester random copolymer A2, the mean degree of polymerization of the polydiol random copolymers A1 and of the boronic ester random copolymers A2, the mass percentage of the polydiol random copolymer A1, the mass percentage of the boronic ester random copolymer A2, optionally, the molar percentage of exogenous compound A4 relative to the boronic ester functions of compound A2, especially of the poly(boronic ester) random copolymer,

. . . .

Advantageously, the content of random copolymer A1 in the lubricant composition ranges from 0.25% to 20% by weight relative to the total weight of the lubricant composition, and preferably from 1% to 10% by weight relative to the total weight of the lubricant composition.

Advantageously, the content of compound A2, especially the content of boronic ester random copolymer, ranges from 0.25% to 20% by weight relative to the total weight of the lubricant composition, and preferably from 0.5% to 10% by weight relative to the total weight of the lubricant composition.

Preferentially, the mass ratio (ratio A1/A2) between the polydiol random compound A1 and compound A2, especially the boronic ester random copolymer, ranges from 0.001 to 100, preferably from 0.05 to 20, even more preferably from 0.1 to 10 and more preferably from 0.2 to 5.

In one embodiment, the sum of the masses of the random copolymer A1 and of compound A2 ranges from 0.1% to 50%, advantageously from 0.5% to 20% relative to the total mass of the lubricant composition, preferably from 4% to 15% relative to the total mass of the lubricant composition, and the mass of lubricant oil ranges from 60% to 99% relative to the total mass of the lubricant composition.

For engine applications, advantageously, the sum of the masses of the random copolymer A1 and of compound A2 represents from 0.1% to 15% relative to the total mass of the lubricant composition.

For transmission applications, advantageously, the sum of the masses of the random copolymer A1 and of compound A2 represents from 0.5% to 50%, relative to the total mass of the lubricant composition.

In one embodiment, the molar percentage of exogenous compound A4 in the lubricant composition ranges from 0.05% to 5000%, preferably from 0.1% to 1000%, more preferably from 0.5% to 500% and even more preferably from 1% to 150% relative to the boronic ester functions of compound A2, especially of the poly(boronic ester) random copolymer.

In one embodiment, the lubricant composition of the invention results from the mixing of:
  0.5% to 20% by weight of at least one poydiol random copolymer A1 as defined previously, relative to the total weight of the lubricant composition;
  0.5% to 20% by weight of at least one compound A2 as defined previously, especially of boronic ester random copolymer, relative to the total weight of the lubricant composition; and
  optionally 0.001% to 0.5% by weight of at least one exogenous compound A4 as defined previously, relative to the total weight of the lubricant composition, and
  60% to 99% by weight of at least one lubricant oil as defined previously, relative to the total weight of the lubricant composition.

In another embodiment, the lubricant composition of the invention results from the mixing of:
  0.5% to 20% by weight of at least one polydiol random copolymer A1 as defined previously, relative to the total weight of the lubricant composition;
  0.5% to 20% by weight of at least one compound A2 as defined previously, especially of boronic ester random copolymer, relative to the total weight of the lubricant composition; and
  optionally 0.001% to 0.5% by weight of at least one exogenous compound A4 as defined previously, relative to the total weight of the lubricant composition, and
  0.5% to 15% by weight of at least one functional additive as defined previously, relative to the total weight of the lubricant composition, and
  60% to 99% by weight of at least one lubricant oil as defined previously, relative to the total weight of the lubricant composition.

Process for Modifying the Viscosity of a Lubricant Composition

Another subject of the present invention is a process for modifying the viscosity of a lubricant composition, the process comprising at least:
  the provision of a lubricant composition resulting from the mixing of at least one lubricant oil, of at least one polydiol random copolymer A1 and of at least one random copolymer A2 comprising at least two boronic ester functions and which can associate with said polydiol random copolymer A1 via at least one transesterification reaction.
  the addition to said lubricant composition of at least one exogenous compound A4 chosen from 1,2-diols and 1,3-diols.

For the purposes of the present invention, the term "modifying the viscosity of a lubricant composition" means adapting the viscosity at a given temperature as a function of the use of the lubricant composition. This is obtained by adding an exogenous compound A4 as defined previously. This compound makes it possible to control the degree of association and of crosslinking of the two copolymers, polydiol A1 and poly(boronic ester) A2. Such a process is described in detail in WO 2016/113229.

Other Subjects According to the Invention

Another subject of the present invention is the use of the lubricant composition as defined above for lubricating a mechanical part.

In the rest of the description, the percentages are expressed on a weight basis relative to the total weight of the lubricant composition.

The compositions of the invention may be used for lubricating the surfaces of parts that are conventionally found in an engine, such as the piston system, rings and jackets.

Thus, another subject of the present invention is a composition for lubricating at least one engine, said composition comprising, and especially consists essentially of, a composition resulting from the mixing of:
  85% to 99.9% by weight, advantageously from 92% to 99% by weight, of a lubricant oil, and
  0.1% to 15% by weight, advantageously from 1% to 8% by weight, of a mixture of at least one random copolymer A1 as defined previously and of at least one boronic ester random copolymer A2 as defined previously; and
  optionally 0.001% to 0.1% by weight of at least one exogenous compound A4 as defined previously;

the composition having a kinematic viscosity at 100° C. measured according to the standard ASTM D445 ranging from 3.8 to 26.1 cSt; the weight percentages being expressed relative to the total weight of said composition.

In a composition for lubricating at least one engine as defined above, the random copolymers A1, especially the copolymer resulting from the copolymerization of at least one monomer of formula (I) with at least one monomer of formula (II-A), at least one monomer of formula (II-B) and at least one monomer M3 of formula (X), and the boronic ester random copolymers A2 as defined previously can thermoreversibly associate and exchange, especially in the presence of the exogenous compound A4; but they do not form three-dimensional networks. They are not crosslinked.

In one embodiment, the composition for lubricating at least one engine also comprises at least one functional additive chosen from the group formed by detergents, anti-wear additives, extreme-pressure additives, additional antioxidants, anticorrosion additives, viscosity-index-enhancing polymers, flow-point improvers, antifoams, thickeners, dispersants, friction modifiers, and mixtures thereof.

In one embodiment of the invention, the composition for lubricating at least one engine, said composition comprising, and especially consists essentially of, a composition resulting from the mixing of:
- 80% to 99% by weight of a lubricant oil, and
- 0.1% to 15% by weight of a mixture of at least one random copolymer A1 as defined previously and of at least one boronic ester random copolymer A2 as defined previously; and
- optionally 0.001% to 0.1% by weight of at least one exogenous compound A4 as defined previously;
- 0.5% to 15% by weight of at least one functional additive chosen from the group formed by detergents, anti-wear additives, extreme-pressure additives, additional antioxidants, anticorrosion additives, viscosity-index-enhancing polymers, flow-point improvers, antifoams, thickeners, dispersants, friction modifiers, and mixtures thereof;

the composition having a kinematic viscosity at 100'C measured according to the standard ASTM D445 ranging from 3.8 to 26.1 cSt; the weight percentages being expressed relative to the total weight of said composition.

The definitions and preferences relating to the lubricant oils, to the random copolymers A1, to the boronic ester random copolymers A2 and to the exogenous compounds A4 also apply to the compositions for lubricating at least one engine.

Another subject of the present invention is a composition for lubricating at least one transmission, such as manual or automatic gearboxes.

Thus, another subject of the present invention is a composition for lubricating at least one transmission, said composition comprising, and especially consists essentially of, a composition resulting from the mixing of:
- 50% to 99.5% by weight of a lubricant oil, and
- 0.5% to 50% by weight of a mixture of at least one random copolymer A1 as defined previously and of at least one boronic ester random copolymer A2 as defined previously; and
- optionally 0.001% to 0.5% by weight of at least one exogenous compound A4 as defined previously;

the composition having a kinematic viscosity at 100° C. measured according to the standard ASTM D445 ranging from 4.1 to 41 cSt, the weight percentages being expressed relative to the total weight of said composition.

In a composition for lubricating at least one transmission as defined above, the random copolymers A1 and the boronic ester random copolymers A2 as defined previously can thermoreversibly associate and exchange, especially in the presence of the exogenous compound A4; however, they do not form three-dimensional networks. They are not crosslinked.

In one embodiment, the composition for lubricating at least one transmission also comprises at least one functional additive chosen from the group formed by detergents, anti-wear additives, extreme-pressure additives, additional antioxidants, anticorrosion additives, viscosity-index-enhancing polymers, flow-point improvers, antifoams, thickeners, dispersants, friction modifiers, and mixtures thereof.

In one embodiment of the invention, the composition for lubricating at least one transmission comprises, and especially consists essentially of, a composition resulting from the mixing of:
- 45% to 99.39% by weight of a lubricant oil, and
- 0.5% to 50% by weight of a mixture of at least one random copolymer A1 as defined previously and of at least one boronic ester random copolymer A2 as defined previously; and
- optionally 0.001% to 0.5% by weight of at least one exogenous compound A4 as defined previously;
- 0.1% to 15% by weight of at least one functional additive chosen from the group formed by detergents, anti-wear additives, extreme-pressure additives, additional antioxidants, anticorrosion additives, viscosity-index-enhancing polymers, flow-point improvers, antifoams, thickeners, dispersants, friction modifiers, and mixtures thereof;

the composition having a kinematic viscosity at 100° C. measured according to the standard ASTM D445 ranging from 4.1 to 41 cSt, the weight percentages being expressed relative to the total weight of said composition.

The definitions and preferences relating to the lubricant oils, to the random copolymers A1, to the boronic ester random copolymers A2 and to the exogenous compounds A4 also apply to the compositions for lubricating at least one transmission.

The compositions of the invention may be used for the engines or transmissions of light vehicles or heavy-goods vehicles, but also ships.

Another subject of the present invention is a process for lubricating at least one mechanical part, especially at least one engine or at least one transmission, said process comprising a step in which said mechanical part is placed in contact with at least one lubricant composition as defined above.

The definitions and preferences relating to the lubricant oils, to the random copolymers A1, to the boronic ester random copolymers A2 and, where appropriate, to the exogenous compounds A4 also apply to the process for lubricating at least one mechanical part.

FIGURES

FIG. 1 schematically represents a random copolymer (P1), a gradient copolymer (P2) and a block copolymer (P3); each circle represents a monomer unit. The difference in chemical structure between the monomers is symbolized by a different color (light gray/black).

FIG. 2 schematically represents a comb copolymer.

FIG. 3 schematically illustrates the exchange reactions of boronic ester bonds between two polydiol random polymers (A1-1 and A1-2) and two boronic ester random polymers (A2-1 and A2-2) in the presence of diols.

FIG. 4 schematically illustrates and represents the crosslinking of the composition according to the invention in tetrahydrofuran (THF).

FIG. 5 schematically represents the behavior of the composition of the invention as a function of the temperature. A random copolymer (2) bearing diol functions (function A) can thermoreversibly associate with a random copolymer (1) bearing boronic ester functions (function B) via a transesterification reaction. The organic group of the boronic ester functions (function B) which exchanges during the transesterification reaction is a diol symbolized by a black crescent. It forms a chemical bond (3) of boronic ester type with release of a diol compound.

EXPERIMENTAL SECTION

Figure 1:
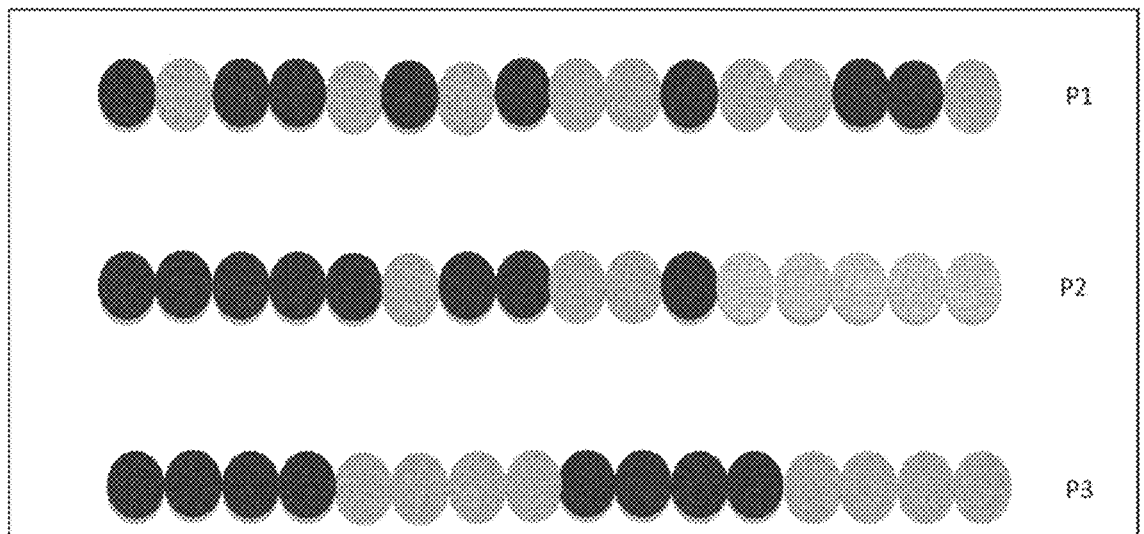
Figure 2:
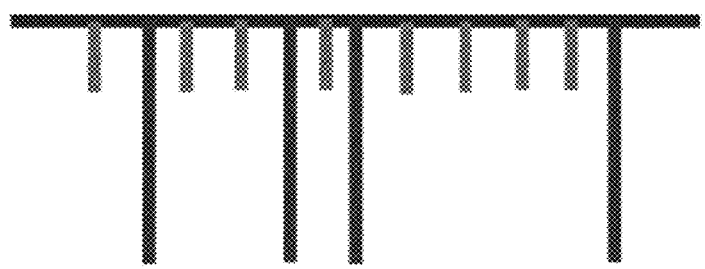
Figure 3:
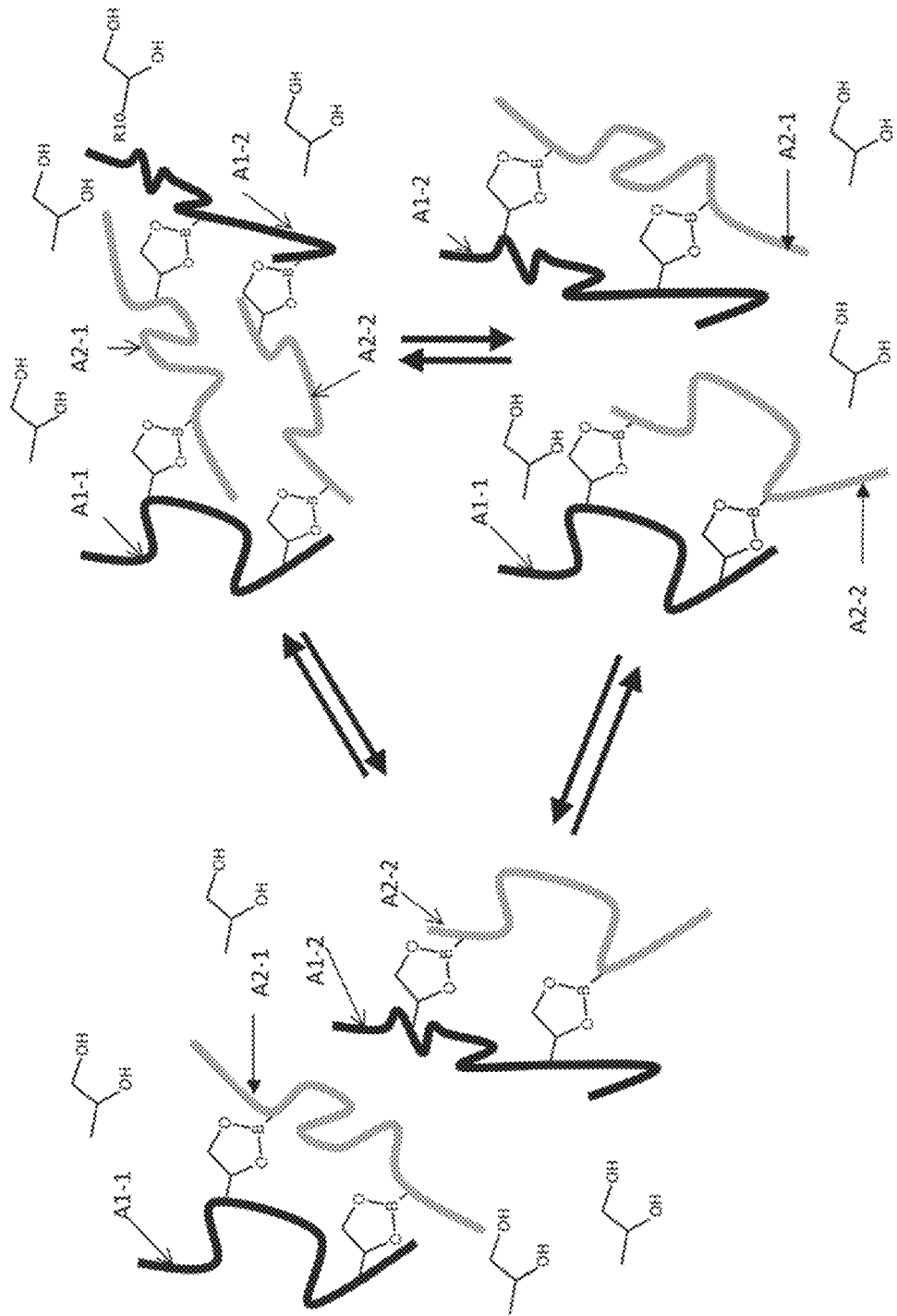
Figure 4:
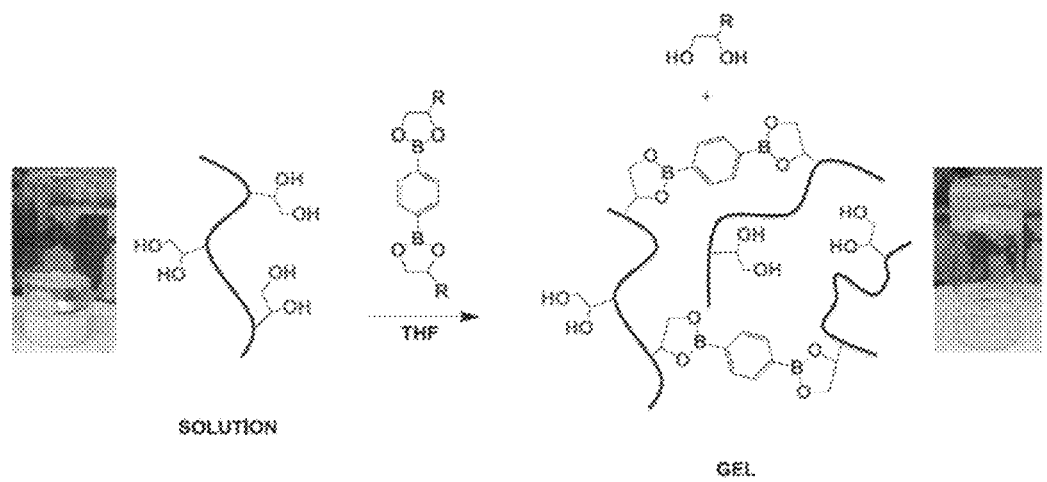
Figure 5:
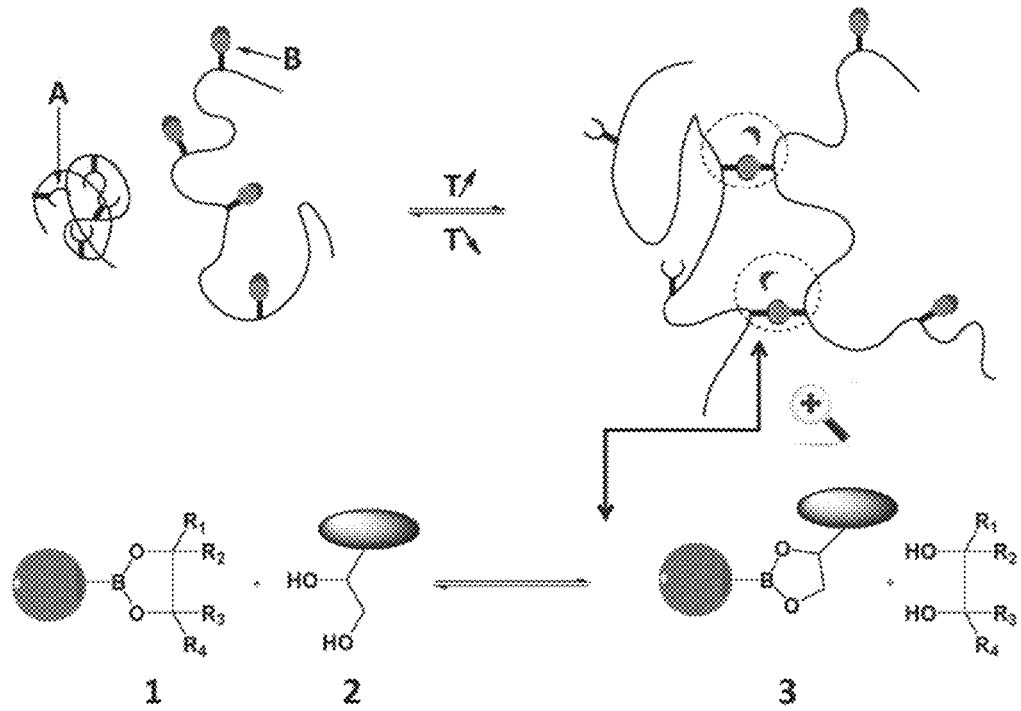

The examples that follow illustrate the invention without limiting it.

1. Synthesis of Random Copolymers A1 Bearing a Diol Function 1.1: Starting with a Monomer Bearing a Diol Function In one embodiment, the random copolymers A1 of the invention are obtained according to reaction scheme 11 below:

Scheme 11

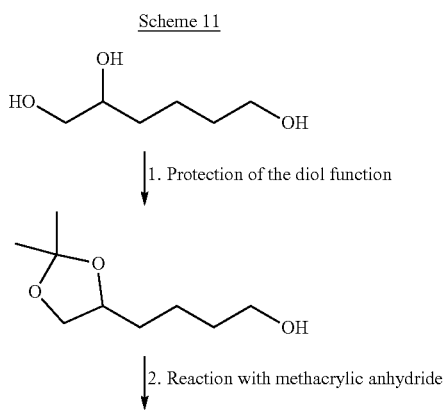

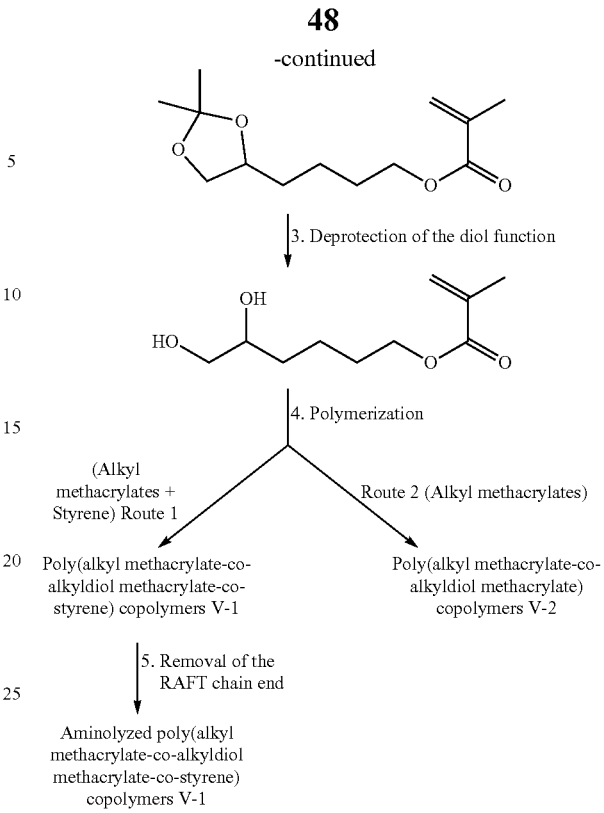

The copolymer obtained after removing the RAFT chain end contains, inter alia, styrene as comonomer and the thiocarbonylthio residue was removed, for example by converting it into a thioether.

1.1.1. Synthesis of the Monomer M1 Bearing a Diol Function

The synthesis of a methacrylate monomer bearing a diol function is performed in three steps (steps 1, 2 and 3 of reaction scheme 11) according to the protocol below:

First Step:

42.1 g (314 mmol) of 1,2,6-hexanetriol (1,2,6-HexTri) are placed in a 1 L round-bottomed flask. 5.88 g of molecular sieves (4 Å) are added, followed by 570 mL of acetone. 5.01 g (26.3 mmol) of para-toluenesulfonic acid (pTSA) are then slowly added. The reaction medium is stirred for 24 hours at room temperature. 4.48 g (53.3 mmol) of $NaHCO_3$ are then added. The reaction medium is stirred for 3 hours at room temperature before being filtered. The filtrate is then concentrated under vacuum using a rotary evaporator until a suspension of white crystals is obtained. 500 mL of water are then added to this suspension. The solution thus obtained is extracted with 4×300 mL of dichloromethane. The organic phases are combined and dried over $MgSO_4$. The solvent is then totally evaporated off under vacuum at 25° C. using a rotary evaporator.

Second Step:

5.01 g (28.8 mmol) of the product thus obtained are placed in a 1 L round-bottomed flask. 4.13 g (31.9 mmol) of DIPEA and 37.9 mg (0.31 mmol) of DMAP are then placed in the flask, followed by 5.34 g (34.6 mmol) of methacrylic anhydride. The flask is then stirred at room temperature for 24 hours. 0.95 g of methanol (29.7 mmol) is then added to the solution and the flask is stirred for a further 1 hour. The product is then dissolved in 40 mL of hexane. The organic phase is then washed successively with 25 mL of water, 3×25 mL of aqueous 0.5 M hydrochloric acid solution, 3×25 mL of aqueous 0.5 M NaOH solution and again with 25 mL of water. The organic phase is dried over $MgSO_4$, filtered and then concentrated under vacuum using a rotary evaporator to give a pale yellow liquid.
Third Step:

17.23 g (71.2 mmol) of the product thus obtained are placed in a 1 L round-bottomed flask. 90 mL of water and 90 mL of acetonitrile are then placed in the flask, followed by 59.1 mL (159 mmol) of acetic acid. The flask is then stirred for 24 hours at 30° C. while a gentle stream of nitrogen is bubbled through to force the removal of the acetone. The solution thus obtained is extracted with 6×30 mL of ethyl acetate. The organic phase is washed successively with 5×30 mL of aqueous 0.5 M NaOH solution and then 3×30 mL of water. The organic phase is then dried over $MgSO_4$, filtered and then concentrated under vacuum using a rotary evaporator to give a pale yellow liquid, the characteristics of which are as follows:

$^1H$ NMR (400 MHz, $CDCl_3$) δ: 6.02 (singlet, 1H), 5.49 (singlet, 1H), 4.08 (triplet, J=6.4 Hz, 1H), 3.65-3.58 (multiplet, 1H), 3.57-3.50 (multiplet, 3H), 3.35 (doublet of doublets, J=7.6 Hz and J=11.2 Hz, 1H), 1.86 (doublet of doublets, J=1.2 Hz and J=1.6 Hz, 3H), 1.69-1.31 (multiplet. 6H).

1.1.2. Synthesis of Methacrylate Copolymers Bearing Diol Functions with Removal of the RAFT Chain End The synthesis of methacrylate copolymers bearing diol functions is performed in two steps (steps 4 and 5 of reaction scheme 11):

Copolymerization of two alkyl methacrylate monomers with a methacrylate monomer bearing a diol function and a styrene monomer;

Removal of the RAFT chain end (aminolysis of the thiocarbonylthio residue to a thiol followed by Michael addition of the thiol with an alkyl acrylate).

1.1.2.1 Synthesis of the Copolymer A-1a

More specifically, the synthesis of the copolymer A-1a is performed according to the following protocol:
First Step:

12.56 g (37.1 mmol) of stearyl methacrytate (StMA), 12.59 g (49.5 mmol) of lauryl methacrylate (LMA), 2.57 g (24.7 mmol) of styrene (Sty), 2.54 g (12.4 mmol) of methacrylate bearing a diol function obtained according to the protocol described in section 1.1.1, 82.5 mg (0.30 mmol) of cumyl dithiobenzoate, 15 mg (0.09 mmol) of azobisisobutyronitrile (AIBN) and 30 mL of anisole are placed in a 250 mL Schlenk tube. The reaction medium is stirred and degassed for 30 minutes by bubbling nitrogen through, and is then maintained at 65° C. for a period of 24 hours.
Second Step:

After 24 hours of polymerization, the Schlenk tube is placed in an ice bath to stop the polymerization, and 30 mL of dimethytformamide (DMF) and 0.4 mL of n-butylamine (4 mmol) are added to the solution without degassing the medium. 15 hours later, 3 mL (21 mmol) of butyl acrylate are added. 16 hours later, the polymer isolated by 3 successive precipitations in methanol, filtering and drying under vacuum at 50° C. overnight. A copolymer is thus obtained with a number-average molar mass ($M_n$) of 53 000 g/mol, a polydispersity index (Ip) of 1.19 and a number-average degree of polymerization ($DP_n$) of 253. These values are obtained, respectively, by size exclusion chromatography using tetrahydrofuran as eluent and poly(methyl methacrylate) calibration and by monitoring the monomer conversion during the copolymerization.

A poly(alkyl methacrylate-co-alkyldiol methacrylate-co-styrene) copolymer A-1a containing about 10 mol % of diol monomer units M1 (obtained according to the protocol described in section 1.1.1) is obtained.

1.1.2.2 Synthesis of the Copolymer A-1c

The synthesis of the copolymer A-1c is performed according to the following protocol:

12.51 g (36.9 mmol) of stearyl methacrylate (StMA), 12.65 g (49.7 mmol) of lauryl methacrylate (LMA), 2.58 g (24.7 mmol) of styrene, 2.51 g (12.4 mmol) of methacrylate bearing a diol function obtained according to the protocol described in section 1.1.1, 15.3 mg (0.06 mmol) of cumyl dithiobenzoate, 4.6 mg (0.03 mmol) of AIBN and 3.2 mL of anisole are placed in a 100 mL Schlenk tube. The reaction medium is stirred and degassed for 30 minutes by bubbling nitrogen through, and is then maintained at 65° C. for a period of 24 hours.

After 24 hours of polymerization, the Schlenk tube is placed in an ice bath to stop the polymerization, and 20 mL of DMF, 30 mL of tetrahydrofuran (THF) and 0.27 mL of n-butylamine (2.7 mmol) are added to the solution. 16 hours later, 4 mL (28 mmol) of butyl acrylate are added. 24 hours later, the polymer is isolated by 3 successive precipitations in methanol and drying under vacuum at 50° C. overnight. A copolymer is thus obtained with a number-average molar mass ($M_n$) of 154 000 g/mol, a polydispersity index (Ip) of 1.23 and a number-average degree of polymerization ($DP_n$) of 893. These values are obtained, respectively, by size exclusion chromatography using THF as eluent and poly(methyl methacrylate) calibration and by monitoring the monomer conversion during the copolymerization.

A poly(alkyl methacrylate-co-alkyldiol methacrylate-co-styrene) copolymer A-1c containing about 9 mol % of diol monomer units is obtained.

1.1.3. Synthesis of Methacrylate Copolymers Bearing Diol Functions without RAFT Chain Removal The synthesis of the methacrylate copolymers bearing diol functions and not having improved properties when compared with the copolymers of the prior art is performed in a single step which consists of the copolymerization of two alkyl methacrylate monomers with a methacrylate monomer bearing a diol function. The term "methacrylate copolymers not having improved properties when compared with the copolymers of the prior art" means methacrylate copolymers bearing diol functions not containing any styrene monomer and always bearing the thiocarbonylthio residue at the chain end. This copolymer is representative of methacrylate copolymers bearing diol functions obtained by following the protocol described in patent application WO 2015/110642 (experimental section § 1.).

More specifically, the synthesis of the copolymer A-1b is performed according to the following protocol:
First Step:

13.38 g (39.5 mmol) of stearyl methacrylate (StMA), 12.58 g (49.4 mmol) of lauryl methacrylate (LMA), 2.01 g (9.9 mmol) of methacrylate bearing a diol function obtained according to the protocol described in section 1.1.1, 93.7 mg (0.34 mmol) of cumyl dithiobenzoate, 12.4 mg (0.08 mmol) of azobisisobutyronitrile (AIBN) and 28 mL of anisole are placed in a 250 mL Schlenk tube. The reaction medium is stirred and degassed for 30 minutes by bubbling nitrogen through, and is then maintained at 65° C. for a period of 18 hours 30 minutes. The polymer is then isolated by 3 successive precipitations in methanol, filtering and drying under vacuum at 50° C. overnight. A copolymer is thus obtained with a number-average molar mass ($M_n$) of 56 700 g/mol, a polydispersity index (Ip) of 1.21 and a number-average degree of polymerization (DP) of 253. These values are obtained, respectively, by size exclusion chromatography using tetrahydrofuran as eluent and poly(methyl methacrylate) calibration and by monitoring the monomer conversion during the copolymerization. A poly(alkyl methacrylate-co-alkyldiol methacrylate) copolymer A-1b containing about 10 mol % of diol monomer units M1 is obtained.

2. Synthesis of the Poly(Alkyl Methacrylate-Co-Boronic Ester Monomer) Copolymer

This synthesis is performed according to the protocol described in patent application WO 2016/113229 (experimental section § 2.).

3. Rheological Studies 3.1 Ingredients for the Formulation of Compositions A to F Lubricant Base Oil The lubricant base oil used in the test compositions is an oil from group III of the API classification, sold by SK under the name Yubase 4. It has the following characteristics:

Its kinematic viscosity at 40° C. measured according to the standard ASTM D445 is 19.57 cSt;

Its kinematic viscosity measured at 100° C. according to the standard ASTM D445 is 4.23 cSt;

Its viscosity index measured according to the standard ASTM D2270 is 122;

Its Noack volatility, as a weight percentage, measured according to the standard DIN 51581 is 15;

Its flash point in degrees Celsius measured according to the standard ASTM D92 is 230° C.;

Its pour point in degrees Celsius measured according to the standard ASTM D97 is −15° C.

Polydiol Random Copolymer A-1a (According to 61.1.2)

This copolymer comprises 10 mol % of monomer bearing a diol function and 24 mol % of styrene monomer. The mean side chain length is 13.5 carbon atoms. Its number-average molar mass is 53 000 g/mol. Its polydispersity index is 1.19. Its number-average degree of polymerization ($DP_n$) is 253. The number-average molar mass and the polydispersity index are measured by size exclusion chromatography measurement using poly(methyl methacrylate) calibration. This copolymer is obtained by performing the protocol described in section 1.1.2.1 above.

Polydiol Random Copolymer A-1c (According to 61.1.2)

This copolymer comprises 9 mol % of monomer bearing a diol function and 26 mol % of styrene monomer. The mean side chain length is 13.5 carbon atoms. Its number-average molar mass is 154 000 g/mol. Its polydispersity index is 1.23. Its number-average degree of polymerization ($DP_n$) is 893. The number-average molar mass and the polydispersity index are measured by size exclusion chromatography measurement using poly(methyl methacrylate) calibration. This copolymer is obtained by performing the protocol described in section 1.1.2.2 above.

Boronic Ester Random Copolymer A-2:

This copolymer comprises 5 mol % of monomers bearing boronic ester functions. The mean side chain length is 12 carbon atoms. Its number-average molar mass is 39 000 g/mol. Its polydispersity index is 1.41. Its number-average degree of polymerization ($DP_n$) is 192. Its number-average molar mass and the polydispersity index are measured by size exclusion chromatography measurement using poly(methyl methacrylate) calibration. This copolymer is obtained by performing the protocol described in section 2 above.

Polydiol Random Copolymer A-1b (According to 1.1.2)

This copolymer comprises 10 mol % of monomer bearing a diol (and does not contain any styrene). The mean side chain length is 13.8 carbon atoms. Its number-average molar mass is 56 700 g/mol. Its polydispersity index is 1.21. Its number-average degree of polymerization ($DP_n$) is 253. The number-average molar mass and the polydispersity index are measured by size exclusion chromatography measurement using poly(methyl methacrylate) calibration. This copolymer is obtained by performing the protocol described in section 1.1.3 above.

3.2 Formulation of Compositions for the Viscosity Study

Composition A (Comparative) is Obtained in the Following Manner:

It contains a solution containing 4.20% by mass of a polymethacrylate polymer in a lubricant base oil from group III of the API classification. The polymer has a number-average molar mass ($M_n$) equal to 106 000 g/mol, a polydispersity index (Ip) equal to 3.06, a number-average degree of polymerization of 466 and the mean side chain length is 14 carbon atoms.

This polymethacrylate is used as viscosity-index-enhancing additive. 4.95 g of a formulation with a mass concentration of 42% of this polymethacrylate in a group III base oil and 44.6 g of group III base oil are placed in a flask. The solution thus obtained is stirred at 90° C. until the polymethacrylate has fully dissolved.

A solution containing 4.20% by mass of this polymethacrylate is obtained. This composition is used as reference for the viscosity study. It represents the rheological behavior of commercial lubricant compositions.

Composition B (Comparative) is Obtained in the Following Manner:

6.52 g of polydiol copolymer A-1a (according to § 1.1.1) and 58.68 g of a group III base oil are placed in a flask. The solution thus obtained is stirred at room temperature until the polydiol A-1a has fully dissolved. A solution containing 10% by mass of polydiol copolymer A-1a is obtained.

4.20 g of this solution of polydiol A-1a at 10% by mass in the group III base oil are mixed with 2.80 g of this same base oil. The solution thus obtained is stirred at room temperature for 5 minutes. A solution containing 6% by mass of polydiol copolymer A-1a is obtained.

Composition C (Comparative) is Obtained in the Following Manner:

7.33 g of poly(boronic ester) copolymer A-2 and 65.97 g of a group III base oil are placed in a flask. The solution thus obtained is stirred at room temperature until the poly(boronic ester) A-2 has fully dissolved. A solution containing 10% by mass of poly(boronic ester) copolymer A-2 is obtained.

4.20 g of this solution of poly(boronic ester) A-2 at 10% by mass in the group III base oil are mixed with 2.80 g of this same base oil. The solution thus obtained is stirred at room temperature for 5 minutes. A solution containing 6% by mass of poly(boronic ester) copolymer A-2 is obtained.

Composition D (Comparative) is Obtained in the Following Manner.

4.10 g of polydiol copolymer A-1b (according to § 1.1.2) and 36.90 g of a group III base oil are placed in a flask. The solution thus obtained is stirred at room temperature until the polydiol A-1b has fully dissolved. A solution containing 10% by mass of polydiol copolymer A-1b is obtained.

4.20 g of this solution of polydiol A-1b at 10% by mass in the group III base oil are mixed with 2.80 g of this same base oil. The solution thus obtained is stirred at room temperature for 5 minutes. A solution containing 6% by mass of polydiol copolymer A-1b is obtained.

Composition E (According to the Invention) is Obtained in the Following Manner:

2.80 g of the solution containing 10% by mass of polydiol A-1a prepared previously and 1.4 g of group III base oil are placed in a flask. 2.80 g of the solution containing 10% by mass of poly(boronic ester) A-2 prepared previously are added to this solution. The solution thus obtained is stirred at room temperature for 5 minutes. A solution containing 4% by mass of polydiol copolymer A-1a and 4% by mass of poly(boronic ester) copolymer A-2 is obtained.

Composition F (Comparative) is Obtained in the Following Manner 2.80 g of the solution containing 10% by mass of polydiol A-1b prepared previously and 1.40 g of group III base oil are placed in a flask. 2.80 g of the solution containing 10% by mass of poly(boronic ester) A-2 prepared previously are added to this solution. The solution thus obtained is stirred at room temperature for 5 minutes. A solution containing 4% by mass of polydiol copolymer A-1b and 4% by mass of poly(boronic ester) copolymer A-2 is obtained.

Composition G (According to the Invention) is Obtained in the Following Manner.

1.05 g of the solution containing 10% by mass of polydiol A-1c prepared previously and 5.25 g of group III base oil are placed in a flask. 0.70 g of the solution containing 10% by mass of poly(boronic ester) A-2 prepared previously are added to this solution. The solution thus obtained is stirred at room temperature for 5 minutes. A solution containing 1.5% by mass of polydiol copolymer A-1c and 1% by mass of poly(boronic ester) copolymer A-2 is obtained.

3.3 Apparatus and Protocol for Measuring the Viscosity

The rheological studies were performed using a Couette MCR 501 controlled stress rheometer from the company Anton Paar.

In the case of the polymer formulations which do not form gels in a group III base oil over the temperature range of the study (compositions A to F), the rheology measurements were performed using a cylindrical geometry of reference DG 26.7. The viscosity was measured as a function of the shear rate for a temperature range extending from 10° C. to 150'C. For each temperature, the viscosity of the system was measured as a function of the shear rate from 1 to 100 s$^{-1}$. The measurements of the viscosity as a function of the shear rate at T=10° C., 50° C., 70° C., 110° C., 130° C. and 150° C. were performed (going from 10° C. to 150° C.). A mean viscosity was then calculated for each temperature using the measurement points located on the same plateau.

The relative viscosity calculated according to the following formula $$\left(\eta_{relative} = \frac{\eta_{solution}}{\eta_{base\ oil}}\right)$$

was chosen to represent the change in viscosity of the system as a function of the temperature, since this magnitude directly reflects the compensation for the natural viscosity loss of a group III base oil of the polymer systems studied.

3.4 Rheological Results Obtained

Figure 6:
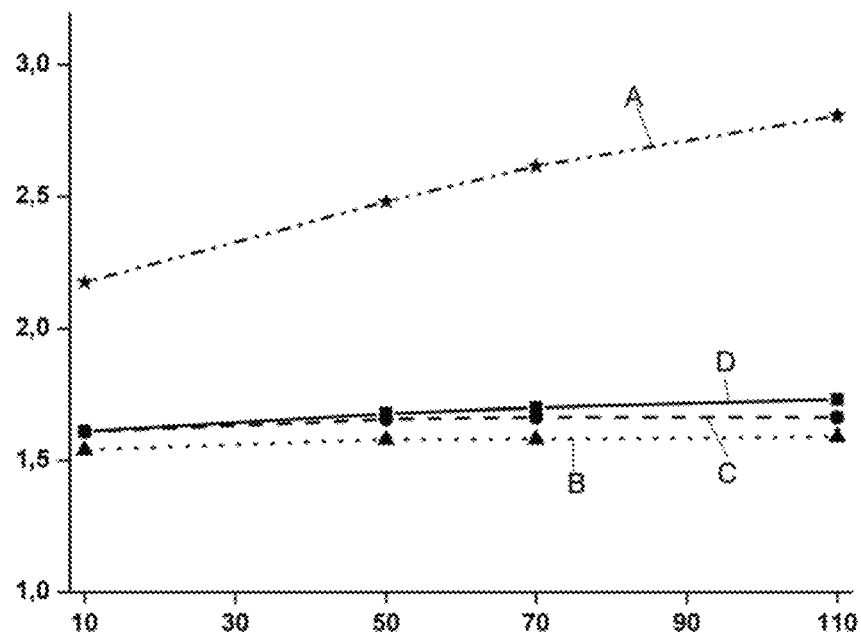
FIG. 6 represents the change in relative viscosity (unitless, on the y-axis) as a function of the temperature (° C., on the x-axis) of compositions A, B, C and D.
Figure 7:
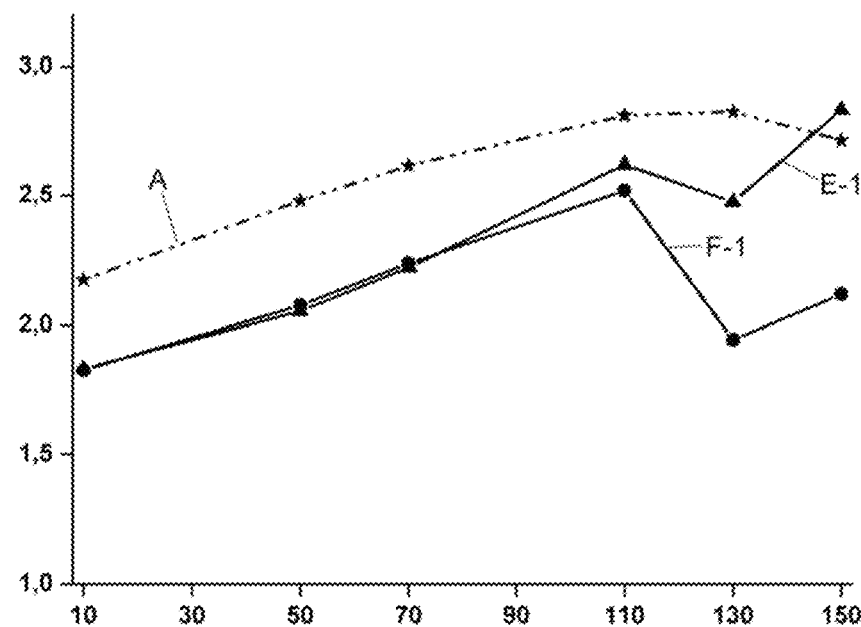
FIG. 7 represents the change in relative viscosity (unitless, on the y-axis) as a function of the temperature (° C., on the x-axis) of compositions A, E and F.
Figure 8:
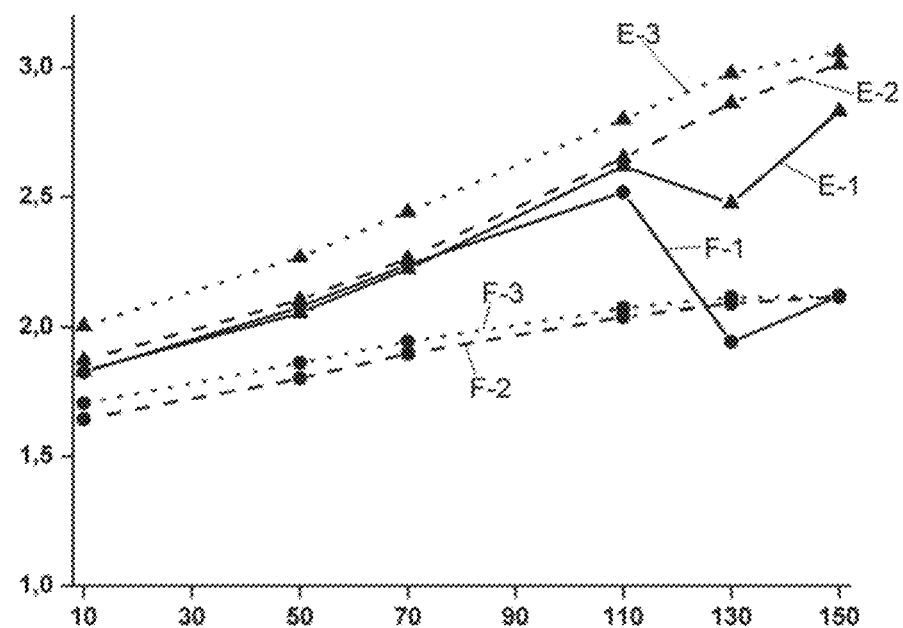
FIG. 8 represents the change in relative viscosity (unitless, on the y-axis) as a function of the temperature (° C., on the x-axis) of compositions E and F for three successive cycles (-1, -2 and -3) of heating and then cooling.

The relative viscosity of compositions A, E and F was studied for a temperature range extending from 10° to 150° C. whereas that of compositions B, C and D was studied between 10° C. and 110° C. In the cases where the viscosity was not perfectly constant with the shear rate, the viscosity of the solution was calculated by taking the mean of the viscosities obtained on all the shear rates. The relative viscosity of these compositions is illustrated in FIGS. 6, 7 and 8. Copolymer A-1a alone in composition B does not allow a significant compensation for the natural viscosity loss of the group III base oil (FIG. 6). This is likewise the case for the poly(boronic ester) copolymer A-2 when it is used alone in composition C or else for the polydiol copolymer A-1b when it is used alone in composition D (FIG. 6).

When the polydiol random copolymer A-1a and the poly(boronic ester) copolymer A-2 are present together in the same lubricant composition (composition E), compensation for the natural viscosity loss of the group III base oil which is greater than that which results from the addition of the polymer methacrylate polymer to the group III base oil (composition A) at 150° C. is observed (FIG. 7). At the same time, composition E shows a lower relative viscosity than composition A (reference polymethacrylate) at 10° C. (FIG. 7). The relative viscosity values are also represented for three successive cycles of heating-cooling between 10'C to 150° C. (E-1, E-2 and E-3). These values change slightly in the course of the 3 cycles, but still give an increase in the relative viscosity of about 1 between 10° C. and 150° C., reflecting the great compensation for the natural viscosity loss of the group III base oil over this temperature range (FIG. 8).

When the polydiol random copolymer A-1b and the poly(boronic ester) copolymer A-2 are present together in the same lubricant composition (composition F), a slight compensation for the natural viscosity loss of the group III base oil is observed (FIG. 7). This compensation is lower than in the case of composition E. The relative viscosity values are also represented for the first three successive cycles from 10° C. to 150° C. (F-1, F-2 and F-3). During the first cycle, composition F gives relative viscosity values that are virtually identical to those of composition E from 10° C. to 110° C. On the other hand, when the temperature reaches 130° C. and then 150° C. during the first heating cycle, the relative viscosity drops substantially (FIG. 8). The next two cycles (F-2, F-3) give comparable relative viscosities and an increase in the relative viscosity when the temperature increases (FIG. 8). For these two cycles an increase in relative viscosity of less than 0.5 is reached between 10° C. and 150° C. This result shows that composition F appears to be degraded after its first passage beyond 110° C. The effect of this degradation is to reduce the compensation for the natural viscosity loss of the oil obtained with this composition (up to 110° C. in the first cycle). The change in composition of the polydiol (addition of styrene and removal of the RAFT chain end) thus made it possible to maintain the rheological properties of composition E for several cycles above 110° C.

Figure 11:
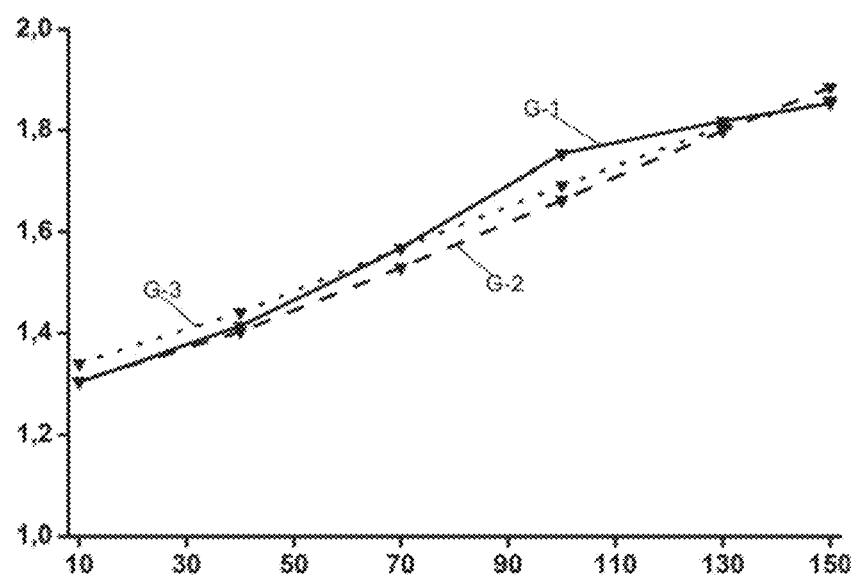
FIG. 11 represents the change in relative viscosity (unitless, on the y-axis) as a function of the temperature (° C., on the x-axis) of composition G for three successive cycles (-1, -2 and -3) of heating and then cooling.

The relative viscosity values for formulation G are represented for three successive cycles of heating-cooling between 10° C. to 150° C. (G-1, G-2 and G-3) in FIG. 11. These values change slightly in the course of the three cycles, but still give an increase in the relative viscosity of about 0.55 between 10° C. and 150° C., reflecting the great compensation for the natural viscosity loss of the group III base oil over this temperature range. Furthermore, irrespective of the cycle, the composition gives a relative viscosity ranging from about 1.3 at 10° C. to about 1.85 at 150° C. Composition G thus appears to be more stable than composition F for this study.

4. Thermogravimetric Studies 4.1 Apparatus and Protocols for Thermogravimetric Analysis (TGA)

The thermogravimetric studies were performed using a TG 209 F1 thermogravimetric analyzer from the company Netzsch. The experiments were performed under a stream of 20 mL/minute of dinitrogen. 15 to 30 mg of polymers are placed in an aluminum crucible before each analysis.

The isotherms were applied for 20 hours at 150° C., whereas the ramps were applied from 25° C. to 600° C. at a heating rate of 10° C./minute.

4.2 TGA Results

Figure 9:
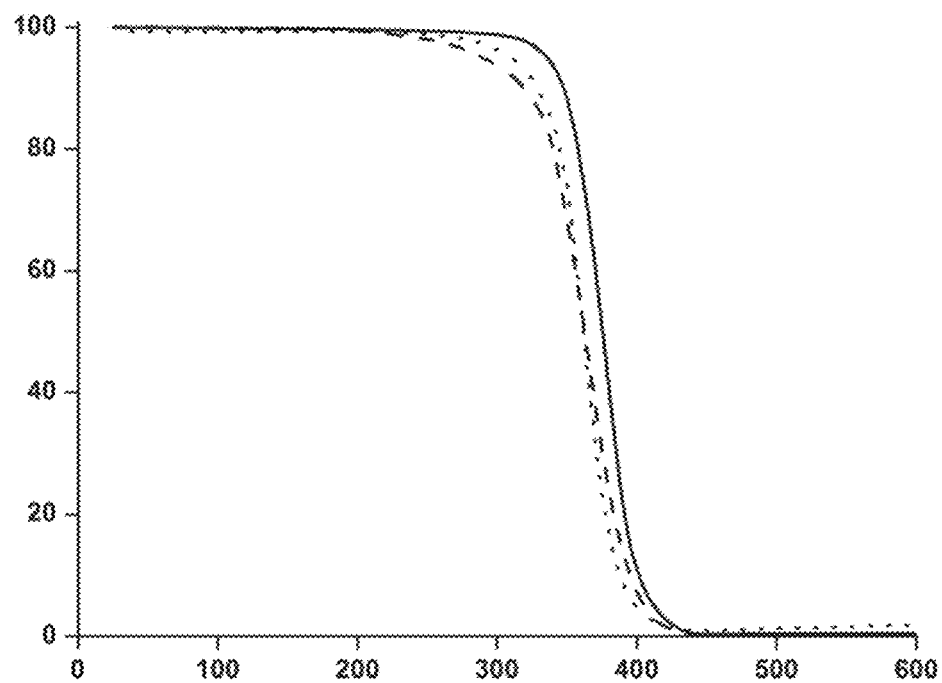
FIG. 9 represents the mass (%, on the y-axis) as a function of the temperature (° C., on the x-axis) of the polydiol A-1a (solid line), of the polydiol A-1c (dotted line) and of the polydiol A-1b (dashes) during a temperature ramp from 25° C. to 600° C. under a dinitrogen atmosphere.

The thermal stability of the polydiol A-1a, of the polydiol A-1c and of the polydiol A-1b was studied under a dinitrogen atmosphere via two different protocols. Firstly, the polydiols were subjected to a temperature ramp from 25° C. to 600° C. so as to observe the change in mass of the samples as a function of the temperature (FIG. 9). Secondly, the polydiols were subjected to an isotherm at 150° C. for 20 hours so as to the change in mass as a function of time under these conditions (FIG. 10).

During the temperature ramp from 25° C. to 600° C., the polydiol A-1a loses 1% of its mass at 290° C. and 5% of its mass at 335° C. and the polydiol A-1c loses 1% of its mass at 240° C. and 5% of its mass at 310° C., whereas the polydiol A-1b loses 1% of its mass at 220° C. and 5% of its mass at 290° C. (FIG. 9). Above 320° C., the three polydiols show a very rapid loss of mass leading to total degradation of these polymers at 450° C. Initiation of the loss of mass thus takes place at lower temperatures for the polydiol A-1b than for the polydiol A-1a and the polydiol A-1c.

Figure 10:
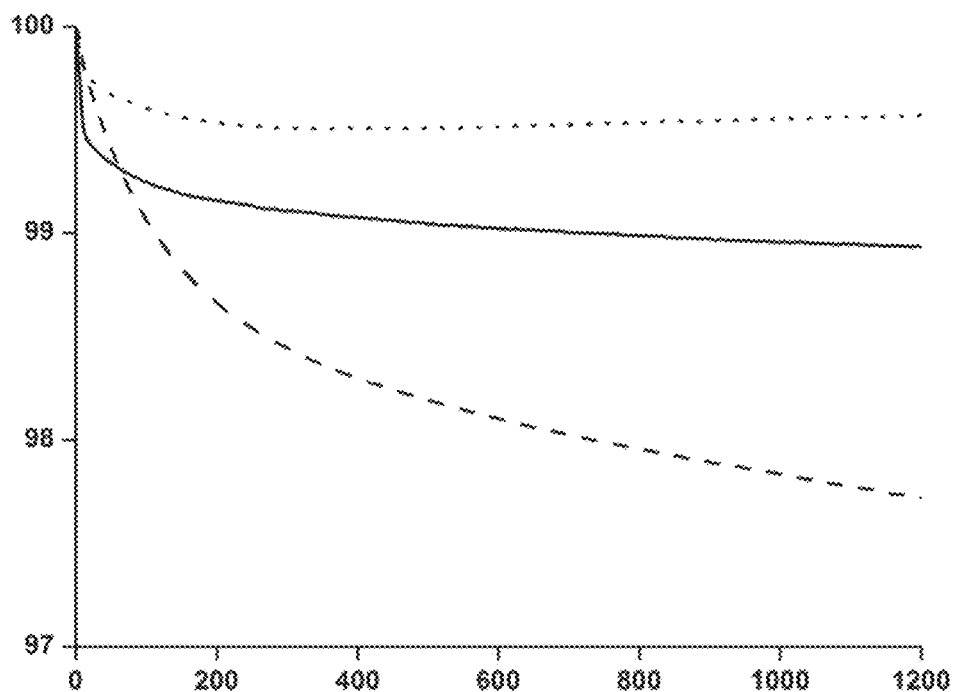
FIG. 10 represents the mass (%, on the y-axis) as a function of time (minutes, on the x-axis) of the polydiol A-1a (solid line), of the polydiol A-1c (dotted line) and of the polydiol A-1b (dashes) during an isotherm at 150° C. under a dinitrogen atmosphere.

Even during the isotherm of 20 hours at 150° C., the polydiol A-1a loses 0.8% of its mass after 2 hours and 1.1% of its mass after 20 hours and the polydiol A-1c loses 0.4% of its mass after 2 hours and 0.4% of its mass after 20 hours, whereas the polydiol A-1b loses 1% of its mass after 2 hours and 3.3% of its mass after 20 hours (FIG. 10). It is probable that the loss of mass which takes place at the start of the isotherm is attributable to the loss of water which has been adsorbed onto the polymers. This result shows that the polydiol A-1b has a greater loss of mass than the polydiol A-1a and the polydiol A-1c during this isotherm. Furthermore, a constant rate of loss of mass appears to become established after 4 hours of isotherm for the polydiol A-1a and after 7 hours of isotherm for the polydiol A-1b. The polydiol A-1a has a loss of mass of 0.009%/hour, whereas the polydiol A-1b reaches a rate of 0.037%/hour (FIG. 10). The polydiol A-1c does not show any significant loss of mass after 3 hours of isotherm at 150° C. This measurement indicates that the polydiol A-1 b degrades more rapidly than the polydiol A-1a and the polydiol A-1c under these conditions.

The invention claimed is:

1. A composition resulting from the mixing of at least one polydiol random copolymer A1 resulting from the copolymerization:

of from 1 mol % to 30 mol % of at least one first monomer M1 of general formula (I):

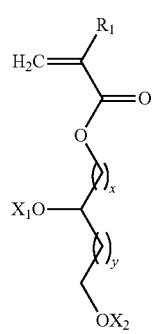

(I)

in which:
$R_1$ is chosen from the group formed by —H, —CH$_3$ and —CH$_2$—CH$_3$;
x is an integer ranging from 1 to 18;
y is an integer equal to 0 or 1;
$X_1$ and $X_2$, which may be identical or different, are chosen from the group formed by hydrogen, tetrahydropyranyl, methyloxymethyl, tert-butyl, benzyl, trimethylsilyl and t-butyldimethylsilyl;
or
$X_1$ and $X_2$ form, with the oxygen atoms, a bridge having the following formula

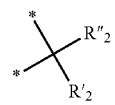

in which:
the asterisks (*) symbolize the bonds to oxygen atoms,
$R'_2$ and $R''_2$, which may be identical or different, are chosen from the group formed by hydrogen and a $C_1$-$C_{11}$ alkyl;
or
$X_1$ and $X_2$ form, with the oxygen atoms, a boronic ester having the following formula:

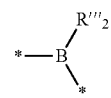

in which:
the asterisks (*) symbolize the bonds to oxygen atoms,
$R'''_2$ is chosen from the group formed by a $C_6$-$C_{30}$ aryl, a $C_7$-$C_{30}$ aralkyl and a $C_2$-$C_{30}$ alkyl;
with from 8 mol % to 92 mol % of at least one second monomer M2 of general formula (II-B):

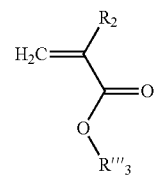

(II-B)

in which:
$R_2$ is —CH$_3$; and
$R'''_3$ is a linear $C_9$-$C_{15}$ alkyl group, and with from 0.1 mol % to 62 mol % of at least one third monomer M2 of general formula (II B) in which:
$R_2$ is —CH$_3$; and
$R'''_3$ is a linear $C_{16}C_{24}$ alkyl group, and
with from 5 mol % to 22 mol % of styrene
wherein the polydiol random copolymer A1 is obtained by a process comprising at least:
one step of radical polymerization controlled by reversible addition fragmentation chain transfer in the presence of a transfer agent having a thiocarbonylthio group and
a step of removal of the thiocarbonylthio group from the polydiol random copolymer A1, a compound A2 comprising at least two boronic ester functions,
wherein compound A2 is a compound of formula (III):

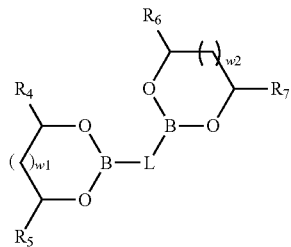

in which:
w$_1$ and w$_2$, which may be identical or different, are integers chosen between 0 and 1;
R$_4$, R$_5$, R$_6$ and R$_7$, which may be identical or different, represent a group chosen from a hydrogen atom, a hydrocarbon-based group comprising from 1 to 30 carbon atoms, optionally substituted with one or more groups chosen from: a hydroxyl, a group —OJ or —C(O)—O—J with J being a hydrocarbon-based group comprising from 1 to 24 carbon atoms;
L is a divalent bonding group chosen from the group formed by a C$_6$-C$_{18}$ aryl, a C$_6$-C$_{18}$ aralkyl and a C$_2$-C$_{24}$ hydrocarbon-based chain, or compound A2 is a random copolymer resulting from the copolymerization
of at least one monomer M4 of formula (IV):

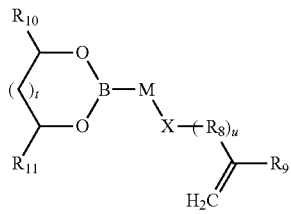

in which:
t is an integer equal to 0 or 1;
u is an integer equal to 0 or 1;
M and R$_8$ are identical or different divalent bonding groups, chosen from the group formed by C$_6$-C$_{18}$ aryl, a C$_7$-C$_{24}$ aralkyl and a C$_2$-C$_{24}$ alkyl,
X is a function chosen from the group formed by —O—C(O)—, —C(O)—O—, —C(O)—N(H)—, —N(H)—C(O)—, —S—, —N(H)—, —N(R'$_4$)— and –O— with R'$_4$ being a hydrocarbon-based chain comprising from 1 to 15 carbon atoms;
R$_9$ is chosen from the group formed by —H, —CH$_3$ and —CH$_2$—CH$_3$;
R$_{10}$ and R$_{11}$, which may be identical or different, represent a group chosen from a hydrogen atom, a hydrocarbon-based group comprising from 1 to 30 carbon atoms, optionally substituted with one or more groups chosen from: a hydroxyl, a group —OJ or —C(O)—O—J with J being a hydrocarbon-based group comprising from 1 to 24 carbon atoms;
with at least one second monomer M5 of general formula (V):

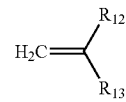

in which:
R$_{12}$ is chosen from the group formed by —H, —CH$_3$ and —CH$_2$—CH$_3$;
R$_{13}$ is chosen from the group formed by a C$_6$-C$_{18}$ aryl, a C$_6$-C$_{18}$ aryl substituted with a group R'$_{13}$, —C(O)—O—R'$_{13}$; —S—R'$_{13}$, —C(O)—N(H)—R'$_{13}$ with R'$_{13}$ being a C$_1$-C$_{30}$alkyl group,
and wherein the mass ratio between copolymer A1 and compound A2 (ratio A1/A2) ranges from 0.05 to 20.

2. The composition as claimed in claim 1, in which the side chains of the random copolymer A1 have a mean length ranging from 8 to 20 carbon atoms.

3. The composition as claimed in claim 1, in which the random copolymer A1 has a molar percentage of monomer M1 of formula (I) in said copolymer ranging from 5% to 25%.

4. The composition as claimed in claim 1, in which the random copolymer A1 has a number-average degree of polymerization ranging from 40 to 2000 and a polydispersity index (Ip) ranging from 1.05 to 4.0.

5. The composition as claimed in claim 1, in which at least one of the following three conditions is met:
either, in formula (IV): u=1, R$_9$ is H and R$_8$ represents a C$_6$-C$_{18}$ aryl or a C$_7$-C$_{24}$ aralkyl and the double bond of the monomer M4 of formula (IV) is directly connected to the aryl group;
or, in formula (V): R$_{12}$ represents H and R$_{13}$ is chosen from the group formed by a C$_6$-C$_{18}$ aryl and a C$_6$-C$_{18}$ aryl substituted with a group R'$_{13}$ with R'$_{13}$ being a C$_1$-C$_{25}$ alkyl group and the double bond of the monomer M5 of formula (V) is directly connected to the aryl group;
or, copolymer A2 comprises at least one third monomer M3 of formula (X)

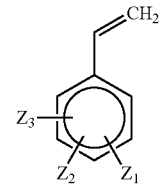

in which:
Z$_1$, Z$_2$ and Z$_3$, which may be identical or different, represent groups chosen from a hydrogen atom, a C$_1$-C$_{12}$ alkyl, and a group —OZ' or —C(O)—O—Z' with Z' being a C$_1$-C$_{12}$ alkyl.

6. The composition as claimed in claim 1, in which the chain formed by the sequence of groups R$_{10}$, M, X and (R$_8$)$_u$, with u equal to 0, in which the chain formed by the sequence of groups R$_{10}$, M, X and (R$_8$)$_u$, with u equal to 0 or 1 of the monomer of formula (IV) has a total number of carbon atoms ranging from 8 to 38.

7. The composition as claimed in claim 1, in which the side chains of copolymer A2 have a mean length of greater than or equal to 8 carbon atoms.

8. The composition as claimed in claim 1, in which copolymer A2 has a molar percentage of monomer of formula (IV) in said copolymer ranging from 0.25% to 30%.

9. The composition as claimed in claim 1, in which copolymer A2 has a number-average degree of polymerization ranging from 50 to 1500 and a polydispersity index (Ip) ranging from 1.04 to 3.54.

10. The composition as claimed in claim 1, in which the content of copolymer A1 ranges from 0.1% to 50% by weight relative to the total weight of the composition.

11. The composition as claimed in claim 1, in which the content of compound A2 ranges from 0.1% to 50% by weight relative to total weight of the composition.

12. The composition as claimed in claim 1, in which the mass ratio between copolymer A1 and compound A2 (ratio A1/A2) ranges from 1 to 10.

13. The composition as claimed in claim 1, which also comprises at least one exogenous compound A4 chosen from 1,2-diols and 1,3-diols.

14. A lubricant composition resulting from the mixing of at least:
- one lubricant oil; and
- one composition as defined in claim 1.

* * * * *